(12) United States Patent
Babcock et al.

(10) Patent No.: US 10,512,223 B2
(45) Date of Patent: *Dec. 24, 2019

(54) MULTI-COMPARTMENT CARBON DIOXIDE SUPPLEMENTATION DEVICE WITH DELAYED ACTIVATION CONTROL

(71) Applicants: Glen Babcock, Missoula, MT (US); Wendy Babcock Garrett, Missoula, MT (US)

(72) Inventors: Glen Babcock, Missoula, MT (US); Wendy Babcock Garrett, Missoula, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,710

(22) Filed: Jan. 15, 2018

(65) Prior Publication Data

US 2018/0177142 A1 Jun. 28, 2018

Related U.S. Application Data

(63) Continuation-in-part of application No. 15/452,360, filed on Mar. 7, 2017, now Pat. No. 9,867,337, which
(Continued)

(30) Foreign Application Priority Data

Nov. 27, 2014 (EM) .......................... 0025864200001
Nov. 27, 2014 (EM) .......................... 0025864200002
(Continued)

(51) Int. Cl.
*A01G 18/64* (2018.01)
*A01G 7/00* (2006.01)
*A01G 7/02* (2006.01)

(52) U.S. Cl.
CPC .............. *A01G 18/64* (2018.02); *A01G 7/00* (2013.01); *A01G 7/02* (2013.01)

(58) Field of Classification Search
CPC ............. A01G 18/64; A01G 7/00; A01G 7/02
(Continued)

(56) References Cited

U.S. PATENT DOCUMENTS 3,577,678 A   5/1971   Burton
3,608,709 A   9/1971   Pike
(Continued)

FOREIGN PATENT DOCUMENTS

WO         1988003360 A1    5/1988
WO   PCT/US2014/046574 A2    1/2015

OTHER PUBLICATIONS

EZ CO2, EZ CO2®, Available Online at: www.ezco2bags.com/about.html, at least as early as Aug. 6, 2012 per Internet Archive Wayback machine: web.archive.org/web/20120806184637/http://www.ezco2bags.com/ about.html.*

*Primary Examiner* — Jennifer M. H. Tichy
(74) *Attorney, Agent, or Firm* — Sarah J. Rhoades

(57) ABSTRACT

A consumer product for supplementing $CO_2$ is provided with delayed activation control and multiple chambers formed by folding and clamping or with multiple clamps. A bag, having a top and a bottom seal and a filter, contains organisms and food substrate, each prepared under sterile laboratory conditions using aseptic techniques. The bag may be selectively clamped at various locations on its exterior. The mycelial mass having mycelia and food, or mycelia separate from the food may be sealed or partially sealed away from the air exchange portal by clamps or folds. With selective chamber isolation, the organisms are manipulated to delay optimized carbon dioxide generation. Utilizing the present invention will extend the product shelf-life, delaying the expiration of the product for storage and shipping. The fungi are utilized
(Continued)

on-demand by removal of the clamp and carbon dioxide flows from the product. Consumers will place the product near indoor plants.

19 Claims, 16 Drawing Sheets

Related U.S. Application Data is a continuation of application No. 14/725,220, filed on May 29, 2015, now Pat. No. 9,622,421, which is a continuation-in-part of application No. 13/032,324, filed on Feb. 22, 2011, now Pat. No. 9,750,196, said application No. 14/725,220 is a continuation of application No. 29/492,375, filed on May 30, 2014, now Pat. No. Des. 790,986, and a continuation of application No. PCT/US2015/033149, filed on May 29, 2015.

(60) Provisional application No. 62/005,406, filed on May 30, 2014, provisional application No. 61/306,269, filed on Feb. 19, 2010.

(30) Foreign Application Priority Data

| Nov. 27, 2014 | (EM) | 0025864200003 |
| Nov. 27, 2014 | (EM) | 0025864200004 |
| Nov. 27, 2014 | (EM) | 0025864200005 |

(58) Field of Classification Search
USPC .......................................................... 435/7.31
See application file for complete search history.

(56) References Cited

U.S. PATENT DOCUMENTS

| 3,673,733 | A | 7/1972 | Merton |
| 3,810,327 | A | 5/1974 | Giansante |
| 3,865,695 | A | 2/1975 | Massier |
| 4,063,383 | A | 12/1977 | Green |
| 4,182,656 | A | 1/1980 | Ahnell et al. |
| 4,543,744 | A | 10/1985 | Royster |
| 4,639,422 | A | 1/1987 | Geimer et al. |
| 4,776,872 | A | 10/1988 | Mulleavy et al. |
| 4,963,353 | A | 10/1990 | Sidhu |
| 4,969,288 | A | 11/1990 | Mori et al. |
| 5,036,618 | A | 8/1991 | Mori et al. |
| 5,230,430 | A | 7/1993 | Kidder |
| 5,370,221 | A | 12/1994 | Magnusson et al. |
| 6,490,824 | B1 | 12/2002 | Maekawa et al. |
| 6,705,043 | B1 | 3/2004 | Opdam et al. |
| 6,748,696 | B1 | 6/2004 | Davidson |
| 7,503,696 | B2 | 3/2009 | Ha et al. |
| 9,386,751 | B2 | 7/2016 | Creekmore |
| 2002/0184820 | A1 | 12/2002 | Mauney |
| 2004/0065006 | A1 | 4/2004 | Weder |
| 2005/0097815 | A1 | 5/2005 | Wasser et al. |
| 2008/0155790 | A1 | 7/2008 | Hsu |
| 2008/0216397 | A1 | 9/2008 | Busby et al. |
| 2012/0023709 | A1 | 2/2012 | Hsu |

\* cited by examiner

MULTI-COMPARTMENT CARBON DIOXIDE SUPPLEMENTATION DEVICE WITH DELAYED ACTIVATION CONTROL

CROSS-REFERENCE TO RELATED APPLICATIONS

This patent application is a continuation in part of application Ser. No. 15/452,360, which application is currently pending and is a continuation of application Ser. No. 14/725,220 now U.S. Pat. No. 9,622,421 B2, and thus this application claims priority under 35 U.S.C. § 119(e) to U.S. Patent Application No. 62/005,406 entitled "Multi-Chamber Mycelium Carbon Dioxide Generator with Delayed Activation Separation Seam Control" filed on May 30, 2014. Application Ser. No. 15/479,245, now U.S. Pat. No. 9,854,745 B2, is a continuation of above referenced U.S. Pat. No. 9,622,421 B2. U.S. Pat. No. 9,622,421 B2 is a continuation in part of U.S. Utility application Ser. No. 13/032,324, now U.S. Pat. No. 9,750,196 B2 entitled "Mycelial Mass with Non-electrical Carbon Dioxide Transfer" filed on Feb. 22, 2011 which claims priority under 35 U.S.C. 119(e)(3) and 37 C.F.R. § 1.7(b) to a U.S. provisional patent application of the same title, No. 61/306,269, filed on Feb. 19, 2010. U.S. Pat. No. 9,622,421 B2 is also a continuation of PCT/2015/33149 filed on May 29, 2015 (national stage applications are currently pending) and claims priority to U.S. design patent application Ser. No. 29/492,375 now Pat. No. D790,986 entitled "Container with Multi-Chamber Separation Seam" filed on May 30, 2014. European Community design registration numbers: 002586420-0001 through 002586420-0005 are also included in the priority family of the present application. The entire disclosures of these patents and applications including the drawings are hereby incorporated by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

1. Field of Invention

This invention relates to consumer products for targeted, non-electrical supplementation of carbon dioxide to indoor gardening environments, and more particularly to consumer products resulting from human preparation of artificial environments to extend the viability of products dependent upon organisms thereby enhancing long-term shelving, shipping, and storage options.

2. Description of the Related Art

In indoor growing environments, adequate levels of light, water, and nutrients must be artificially supplied for good plant growth. Carbon dioxide ($CO_2$) is one of these nutrients. Even though $CO_2$ is one of the most abundant gases in the atmosphere, the focused delivery of carbon dioxide to indoor growing environments is a consistent struggle for growers as plants are constantly depleting the supply restricted by the enclosure.

The percentage of $CO_2$ in the air without any enrichment is defined in terms of ambient carbon dioxide levels. Ambient $CO_2$ levels typically hover around 400 parts per million (ppm) or 775 mg/m$^3$. Indoor plants can quickly convert this $CO_2$ through photosynthesis and deplete available $CO_2$. When $CO_2$ levels fall to around 150 ppm or 291 mg/m$^3$, the rate of plant growth quickly declines. Enriching the air in the indoor growing area to around 1200-1500 ppm or 2325-2907 mg/m$^3$ can have a dramatic, positive effect on plant growth. In such conditions, growth rates typically increase by up to thirty percent (30%). Stems and branches grow faster, and the cells of those areas are more densely packed. Stems can carry more weight without bending or breaking. $CO_2$ enriched plants have more flowering sites due to the increased branching effect.

The importance of $CO_2$ enrichment to enhance plant growth is even greater when other important natural resources are present in only suboptimal quantities. When other nutrients are in such short supply, plants cannot survive under ambient $CO_2$ concentrations. Elevated levels of $CO_2$ often enable such vegetation to grow and successfully reproduce where they would otherwise die. One of the reasons that plants are able to respond to indoor $CO_2$ enrichment in the face of significant shortages of light, water, and nutrients is that $CO_2$ enriched plants generally have more extensive and active root systems, which allows them to more thoroughly explore larger volumes of soil in search of the nutrients they need.

Carbon dioxide enrichment also affects the way a plant can tolerate high temperatures. At the highest air temperatures encountered by plants, $CO_2$ enrichment has been demonstrated to be even more valuable. It can often mean the difference between a plant living and dying, as enhancement typically enables plants to maintain positive carbon exchange rates in situations where plants growing under ambient $CO_2$ levels and environments with nominal $CO_2$ levels exhibit negative rates that ultimately lead to their demise.

Under normal growing conditions, water rises from the plant roots and is released by the stomata during transpiration. $CO_2$ enrichment affects transpiration by causing the stomata to partially close. This slows down the loss of water vapor into the air. Foliage on $CO_2$ enriched plants is much thicker and slower to wilt than foliage on plants grown without $CO_2$ enrichment.

$CO_2$ plays an important part in other vital plant and animal processes, such as photosynthesis and respiration. Photosynthesis is the process by which plants make carbohydrates. During photosynthesis the chlorophyll in the chloroplasts of green plants convert sunlight, $CO_2$ and water into food compounds, such as glucose and carbohydrates, and oxygen ($O_2$). This process, also called carbon assimilation, has the following chemical reaction:

$$6CO_2 + 6H_2O \rightarrow C_6H_{12}O_6 + 6O_2.$$

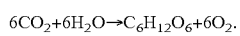

Plants can quickly use up the available $CO_2$ and convert it to $O_2$, a waste by-product of photosynthesis. When plants are able to access needed $CO_2$, the result is larger plants with larger yields.

Because plants are shown to thrive when enriched with $CO_2$ and because plants growing indoors under artificial light often lack enough $CO_2$ to efficiently photosynthesize, the use of products to supplement $CO_2$ have become prevalent. While $CO_2$ enrichment for indoor gardening is nothing new, growers have recently been looking for new, lower cost alternatives to expensive propane burners and $CO_2$ bottle systems. With fuel costs continuing to rise, propane use for $CO_2$ will soon be obsolete. And while indoor gardening is not new, a growing trend of "be your own farmer" has caused the industry to explode.

Growers have attempted to boost $CO_2$ available to indoor growing environments from many varied sources. In the past, carbon dioxide has been supplied to indoor production facilities, indoor growing environments, or greenhouses by using specialized $CO_2$ generators to burn carbon-based fuels such as natural gas, propane, and kerosene, or directly piping it from tanks of pure $CO_2$. These sources have had disadvantages including: high costs of production, increased temperature or moisture in localized areas and to particular plants, disease or contamination as may occur from incomplete combustion or the presence of foreign chemicals or by-products. Due to these and other disadvantages, prior inventions have proposed that fossil fuels should no longer be used for indoor gardening.

Even with the goal to cease use of fossil fuels, problems persist with $CO_2$ production methods currently in use. Of course, utilizing fossil fuels is a wasteful process when producing $CO_2$. But with the increasing focus on becoming more "green" and decreasing costs, the continuous use of electricity must be avoided. Use and reuse must be prioritized. Initial set-up and maintenance costs must be reduced. Prior inventions have mandated the use of an electrical mechanism or an electrically activated pump or fan to move the $CO_2$. The ongoing use of electricity and permanent parts such as pumps do not sufficiently decrease the cost of operation for the $CO_2$ production systems. Such systems also need refills and do not provide a recyclable source of $CO_2$. Because those $CO_2$ production methods require the use of continuous electricity, they are not environmentally friendly. Furthermore, increased energy prices make all of these prior $CO_2$ production systems undesirable. A need exists for a method of boosting $CO_2$ production in indoor growing spaces without requiring additional, artificial energy inputs.

The trend toward smaller, indoor growing spaces creates demand for low-cost, environmentally friendly products. Small, penny-wise operations, similar to larger operations, are looking to save money and avoid spending thousands of dollars to be able to supply their grow space with $CO_2$. With these small operations in mind, some alternatives have been developed, including inventions which have sought to supplement $CO_2$ through the use of compost, yeast, dry ice, pads, or buckets. While trying to utilize natural processes, these inventions have failed to sufficiently supply $CO_2$ and meet other demands of indoor growing environments.

First, the utilization of compost for $CO_2$ has been used for years but with some drawbacks. The composting of organic matter results in bacteria breaking down the organic matter and as a result, one of the by-products is $CO_2$. Many large scale greenhouses have used composting rooms adjacent to the growing greenhouse to provide $CO_2$ for their crop. $CO_2$ is pumped from one room into the other byway of circulation fans. Besides requiring large amounts of space and energy for circulation fans, composting so close to growing areas can attract insects that could potentially damage valuable crops.

Next, the process of mixing sugars, water, and yeast has been used to produce $CO_2$. The yeast eats the sugar and releases carbon dioxide and alcohol as by-products. The process requires precise control of water temperature. Water too hot will kill the yeast and if the water is too cold, the yeast will not activate. While the use of yeast to supplement $CO_2$ is somewhat simple and inexpensive, it does have some drawbacks. It also requires a lot of space, presents an odor problem, and requires repeated, time consuming re-mixing every 4-5 days.

Dry ice is a solid or frozen form of carbon dioxide and it releases $CO_2$ when exposed to the atmosphere. As it melts it is converted from a solid to a gas. Dry ice has no liquid stage, which makes it easy to work with and requires little clean-up. However, dry ice can be expensive for long-term use and it is difficult to store because it is constantly melting away. Using insulated containers can slow the melting process, but it cannot be stopped.

$CO_2$ pads were developed from products used in the food storage industry, primarily the pads used for fresh food storage. The presence of $CO_2$ helps prevent decay, so these pads are used to increase the shelf life of meat, fish, and poultry. $CO_2$ is produced by the pads using sodium bicarbonate and citric acid, also known as baking soda and vinegar. For activation, the $CO_2$ pads must be wet and since they dry out quickly, water or moisture must be reapplied every few days. It is suggested to replace them every two weeks. The use of pads requires continued attention to ensure the pads do not dry out and the area they can impact is limited. They also require harmful waste to be deposited into the environment.

Additional products also utilize other naturally occurring biological processes such as respiration to supplement $CO_2$ to plants. As has been understood for years, organisms breakdown carbons and digest organic materials resulting in the production of $CO_2$. Those organisms include bacteria, fungi, and all animals. Humans, animals and fungi, in turn, convert food compounds by combining food with oxygen to release carbon dioxide as well as energy for growth and other life activities. This respiration process, the reverse of photosynthesis, has the following chemical reaction:

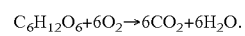

$$C_6H_{12}O_6 + 6O_2 \rightarrow 6CO_2 + 6H_2O.$$

Fungi, commonly known as mushrooms, and their saprobe relatives perform a vital function in the availability of carbon dioxide and other elements through these processes. As is evident in each reaction, plants and animals use carbon in their respective life and energy cycles. Plants develop through photosynthesis, a process wherein plants use energy from the sun and carbon dioxide to produce carbohydrates, especially cellulose. Animals consume carbohydrates. The waste and non-living organic bodies resulting from these processes are decomposed by the fungi saprobes. These saprobes get energy and nourishment by biochemical decomposition processes, digesting dead or decaying organic matter in the soil. The fungi excrete digestive enzymes and other chemicals directly onto a food source, which induces the matter to break down for consumption by the organism. The fungi then absorb the consumable products. Some fungi utilize aerobic respiration, which as shown above, is the breakdown of carbohydrates with oxygen into carbon dioxide and water. Others use various anaerobic processes that do not require oxygen, but these processes produce much less energy. Actually, most fungi are capable of doing either, depending on the soil conditions.

The first products which sought to use biological processes of fungi to artificially enhance $CO_2$ to indoor growers were buckets. The buckets offered a non-sterile, mushroom-based $CO_2$ system that utilized technology from the *Agari-*

*cus* or button mushroom industry. The bucket required electricity and a pump to distribute $CO_2$ due to the substrate's less aggressive production of $CO_2$. Short life span and expensive re-fills made this choice undesirable and buckets are nearly extinct in the $CO_2$ supplementation market. The disposal of these heavy-duty, plastic buckets is creating a further impact on the environment.

Since the present inventors' products have arrived on the market, other vendors have sought out means to create their own mushroom $CO_2$ bags. Mushroom $CO_2$ bags appear similar to the present invention but have many, and critical shortcomings which make them substantially less effective, if not inoperative. Some competing mushroom bags tout that they can be partially opened in order to take advantage of an added ability to grow mushrooms right from the bag. This proposed functionality adds unwanted risk for contamination of an indoor garden environment. Opening the bag to allow the mushrooms to grow also compromises the environment inside the bag. Yet, if these bags are allowed to remain closed, mushroom fruiting bodies will form inside, and when not removed those fruiting bodies can create an unsightly mess and the potential for reduced garden health. These shortcomings are further exasperated by the fact that these knock-off $CO_2$ mushroom bags can supply $CO_2$ supplementation for only 2-3 months.

BRIEF SUMMARY OF THE INVENTION

The present inventors have developed unique products to harness and selectively supply supplemental $CO_2$ in indoor growing environments. In this original and unexpected present invention, a carbon dioxide supplementation device comprises more than two chambers and delayed activation control. The aspects of the present invention enhance the commercial viability and profitability of organism-based $CO_2$ generation consumer products. The present invention permits additional manipulation and development of the artificial growing environment, and thus life cycle of carbon-dioxide producing organisms, such as mycelia. For simplicity herein, this disclosure will reference mycelia but it is intended and should be understood and apparent that any carbon dioxide producing organism or group of organisms with the required characteristics could be substituted to meet the objectives of this invention. One variation of the present invention calls for one external sealing mechanism to seal the bag into three chamber zones while another variation will seal the bag into at least three chamber zones by using two or more external sealing mechanisms. Additional chamber zones could be introduced, and additional external sealing mechanisms could be implemented as desired. In one embodiment, this mycelia-based, carbon dioxide supplementation consumer product is provided with two or more delayed activation controls in the form of the two or more-external separation seams. The ideal consumer product comprises a bag having a top-seal and a bottom-seal and a micro-porous air exchange portal, prepared mycelia, two or more chamber zones, and an external sealing mechanism. The chamber zones may be empty or filled with mycelia and/or food and thus be viewed as being two chambers or more than two chambers where at least one of the chambers holds only air. Preferably, the product will be sold with three chamber zones created by one external sealing mechanism; however, three or more than three chamber zones could be created by more than one external sealing mechanism. In the preferred embodiment, the lower chamber zone begins at the bottom of the bag which has been previously sealed. The lower chamber zone ends at the bottom of the temporary seal which has been created with the introduction of an external sealing mechanism applied to the exterior of the bag. One aspect of the present invention calls for placement of mycelial mass so that the lower chamber zone receives a mycelial mass prepared such as by methods described in U.S. Pat. No. 9,750,196 B2. In another aspect of the present invention, the lower chamber zone receives only a bulk food growth substrate. In another aspect of the present invention, the lower chamber receives only mycelia and a limited nutrient substrate such as the one described herein. The upper chamber zone begins at the top of the temporary seal created by an upper-most external sealing mechanism. As with the lower chamber, the upper chamber may alternatively receive mycelia, a growth medium or food source, or mycelial mass. In one variation of the present invention, a middle chamber zone is created by a fold in the bag. In another variation, one or more middle chambers are formed by the application of multiple external sealing mechanisms. According to the preferred embodiment, a middle chamber zone incorporates the micro-porous air-exchange portal; however, one or more middle chamber zones may alternatively receive the air exchange portal, mycelia, a growth medium, or mycelia and food source. The middle chamber zone or zones exist between the temporary seals created by the one, or more than one, external sealing mechanisms. The upper chamber zone ends at the top seal of the bag which is created according to the procedure of the present inventors' methodology.

While any sealing apparatus meeting the stated objectives is intended, the preferred sealing apparatus comprises a tight, flat, and elongated seal and may have abutting surfaces achieving a seal by the external seam which does not puncture or compromise the integrity of the container. In the preferred embodiment, the external sealing mechanism creates a nearly air-tight seal enhanced by the extra fold of the bag in the external sealing mechanism. The bag fold of the preferred embodiment works in conjunction with the external sealing mechanism and succeeds in separating the lower chamber zone from the air exchange portal and also sealing the air exchange portal from the upper chamber zone. In a variation of the invention, the bag is not folded but two external sealing mechanisms are applied so that a first external seal separates the middle exchange zone from the lower chamber zone and a second external seal separates the middle chamber zone from the upper chamber zone. According to one embodiment of the present invention, the middle chamber zone created by the two seals will encompass the interchange portal. The clamping action of the at least one external sealing mechanism segregates the interior chambers of the bag through only exterior action. According to the preferred embodiment, air flow is restricted to the zone containing the mycelia or mycelial mass within the confines of the bag. Air flow may also be restricted or partially restricted to empty chamber zones or to chamber zones only holding a food source or growth medium. Air may flow freely into the chamber zone which includes the air exchange portal. This clamping or sealing mechanism may be accomplished by any apparatus which will provide a substantially air-tight seal and which may be removed only when the user desires for the product to begin to supplement $CO_2$ to an indoor growing environment. The external sealing mechanism serves to allow the producer, retailer, and consumer to delay the supplementation of $CO_2$ until the product is placed in the indoor growing environment where enhancement of $CO_2$ is desired.

The mycelia and mycelial mass must be specially prepared such as by the methodology described in U.S. Pat. No.

9,750,196 B2. By artificial intervention, an ideal growing environment for a carbon dioxide producing saprobe or fungi is created and then further manipulated to result in a consumer product with a non-electrical, filtered, $CO_2$ generator for use in environments such as an indoor plant growing environment. Mycelia are specially selected, treated, and isolated through a laboratory process to ensure the highest quality product with the lowest risk of contamination. The first step entails testing, identifying, and isolating the best mycelial strain for the objectives of the present invention. Important organism characteristics to consider include speed of colonization, strength of mycelial threads, and the inability to fruit. Having tested the amount of $CO_2$ produced by each strain and after a long and vigorous process, one specialized strain of Turkey tail (*Trametes versicolor*) was selected for the preferred embodiment. It is a mycelial strain that produces little or no primordia but has more vigor and therefore produces more $CO_2$ for a longer period of time. Through a process of tissue transfers from petri plate to petri plate, the inventors sub-cultured this strain a number of times. With a trained eye, colonies with desirable characteristics were selected. The threads of mycelium having those characteristics were selectively transferred into a new plate, thereby insuring that optimal characteristic were preserved and encouraged in successive generations. The perfected strain is the source of the pure fungi strain of the present invention. It is cryogenically stored in a number of strain vaults at various locations until it is needed to culture petri plates to begin the manufacturing process.

According to standard laboratory protocols and procedures, when working with mycelial cultures technicians must ensure a continually, strict, sterile environment. The mycelial cultures are grown out on a petri plate; the preferred medium substrate is potato dextrose agar. The mycelium is allowed to colonize the plate after the nutritious substrate is sterilized by autoclaving at two-hundred, fifty degrees Fahrenheit (250° F.), or 121 degrees Celcius (herein ° C.), for one hour and then cooled. The culture is moved to another nutritious substrate, containing nutrients such as cereal grains, where the mycelial spawn can proliferate. The mycelium is allowed to completely populate the substrate before it is moved again.

The final substrate for the purpose of $CO_2$ production inside the end-consumer product is prepared according to specifically developed techniques which optimize the carbon/nitrogen (C/N) ratio. Most mushroom producers pay little attention to what may be the single most important factor for a good substrate. The optimal substrate is fortified with more nutrients than normal mushroom substrates which allows for more $CO_2$ production over a longer period of time. The substrate is blended and water is added to achieve a moisture content of around sixty-five percent (65%). The blended substrate and water is placed into a heat tolerant bag containing a micro-porous breather patch that will allow the bag to breathe after it is inoculated, sealed, and activated by the end user. Each bag, containing the hydrated substrate, is autoclaved to sterilize the container of substrate. Typical autoclaving parameters are 10 hours at 15 pounds per square inch (PSI) (1.0549 kg/cm) or 250° F. (121° C.). Once sterilized, each bag is allowed to cool in a High Efficiency Particulate Air (HEPA) filtered environment to further ensure and maintain sterility. Each bag is properly cooled to about 75 degrees Fahrenheit (23.9° C.). For embodiments of the present invention which require separation of the mycelia and the food substrate, external seals would be applied at this time. However, for embodiments calling for a mycelial mass—which comprises the food substrate and the mycelia—the cooled bag is then inoculated with the nutrient substrate populated with mycelia spawn. Additional external sealing mechanisms may be applied at this time or after the final top seal of the bag is created. In any case, after a resting period, the top of the bag is permanently sealed such as by use of a high-heat, continuous belt sealer. The completed bags are pressure tested to insure a good seal, any additional and not previously applied external sealing mechanisms are added and then the bag may be allowed to incubate while the mycelium recovers from the transfer. Either immediately, or after a short period of time such as one to three days after inoculation, mycelial growth is evident and it is time to apply the external clamp and label. Prior to the application of the external clamp, the bag may be folded according to the preferred embodiment. Each bag receives a replace-by date and is packed and ready to ship. Ideally, bags are made to order and ship within one (1) week of inoculation occurring according to the preferred embodiment.

The finished product is shipped directly to a number of stores as well as to a number of distributors. If the bag embodiment has jointly placed the mycelia and the food source growing medium, then, within the next few weeks, the color of the bag contents changes from the brown color of the substrate to the whitish color of the mycelium. If the bag embodiment has separated the mycelia and the food source growing medium, then the change in color will be delayed until the external seal is removed, and the mycelia are joined with the bulk food substrate growing medium. The white color, which appears only when prepared according to these proprietary specifications, indicates optimum $CO_2$ production has commenced. With the external clamp applied as a device to delay activation according to the preferred embodiment, the substrate and mycelium mixture will turn white between about 90-120 days. If no clamp had been applied, then there would be no delay in activation and the bag contents would turn white within approximately 30 days.

In summary and according to the specifications herein the process of preparing the present invention comprises the following steps:

growing a pure fungi strain in a petri plate from a tissue culture previously purified and stored;

proliferating a pure spawn colony from the petri plate strain by combining the spawn colony with previously sterilized water and nutrient additives prepared and sterilized in a sterile vessel and incubating the combination of the spawn colony, the nutrient additives, and the water in the sterile vessel;

placing a blend of a cellulose-based substrate, such as but not limited to sawdust, nutrient additives, and water in a container with at least one $CO_2$ portal or vent, preferably a polypropylene bag with at least one vent, and autoclaving the bag and the substrate;

removing the combination of the spawn colony under strict sterile conditions from the sterile vessel and alternatively either forming a mycelial mass by mixing the combination of the spawn colony with the cellulose-based substrate in the container once it has cooled after autoclaving or applying an external seal to the exterior of the container in order to keep the spawn colony separate from the cellulose-based substrate;

sealing the top opening of the bag containing the mycelial mass or separated spawn colony and growth substrate such as by a heat seal;

for bags containing a mycelial mass incubating the mycelial mass mixture in the bag for a period of time, typically less than 72 hours;

for bags requiring initial or additional external seals, securing an external sealing mechanism to the bag according to the present invention;

transferring the sealed bag to a point of purchase by an end consumer, a store, or a distributor.

The end consumer will activate the $CO_2$ supplementation by removing the external seal, taking any additionally necessary steps, such as repurposing the seal to serve as a hanger or mixing any unmixed growth substrate, and placing the bag in an indoor gardening environment, preferably at a height above the level of the plants. The increased $CO_2$ supplementation enhances plant growth in the indoor growing environment.

The process of making the invention utilizes laboratory skills and a pure mycelium strain cultured under sterile conditions and cultivated in sterilized media. This invention is designed to produce $CO_2$ for use in any indoor growing area including but not limited to greenhouses, grow tents, grow boxes and grow cabinets. It is intended for use in any terrestrial indoor grow area as well as any enclosed grow areas not on this earth. It is non-electrical with no moving parts or components other than the external seal which in the preferred embodiment is moved to the top of the bag and used as a hanging apparatus. The supplementation of $CO_2$ will benefit plant growth and plants will grow to be larger, be more robust and have increased yields. As described, most prior $CO_2$ production systems were based on the burning of fossil fuels. This is not only a wasteful process, but it is unnecessary. The use of the mycelial mass of the present invention to produce $CO_2$ is an improvement over existing methods and no electrical components are required. Any ongoing use of electricity would be wasteful and unnecessary. The present invention combines ideal components to provide an optimal solution. The mycelial mass prepared and spawned from the preferred strain of mycelium will produce $CO_2$ for at least 6 months after clamp removal without any undesirable effects. A one-time cost is incurred at start-up. There is no need for refills or adjustments. After six (6) months the container can be recycled as plastic and the mycelial mass can either be mixed into a compost pile or spread out as a soil amendment.

In the present invention, a first chamber zone, also called the activator zone comprises an active or biological compound like mycelia while the second chamber zone, also called the receptor zone, comprises a non-active or non-biologically active substance such as the food growth substrate described herein, both of these chamber zones occur separately from a third chamber zone which comprises only the air exchange portal. More specifically, and in the present embodiment, by way of example and not necessarily by way of limitation, for purposes of fungal and natural $CO_2$ products, the three distinct zones are: 1) sterilized un-inoculated growing media zone; 2) air exchange portal zone; and 3) sterilized inoculated spawn of one or more biologically active organisms. The zones are separated by the separation seam such that it will not allow for mycelial transfer between the three distinct zones. In additional embodiment, an additional number of chamber zones are added by adding bag folds or more external sealing mechanisms.

The present invention has proper execution of a product which will harness and selectively supply supplemental $CO_2$ to an indoor growing environment. This invention will satisfy the need in the industry to provide a reliable $CO_2$ supplement for indoor growing environments with an end-user activation aspect permitting an extended shelf life for the consumer goods. The careful preparation according to preferred methods and with proper sterilization techniques prevents unsightly and foul smelling infestation by bacteria or rotting mushroom caps. The present invention provides $CO_2$ generating products that have been extremely successful in the marketplace under the ExHale® brand. The ExHale® brand $CO_2$ bags satisfy the need for a less expensive, easier, safer and more harmonious way for farmers to provide plants with enhanced $CO_2$. The ExHale® brand $CO_2$ bags supplement $CO_2$ 24 hours per day with no need to refill bottles or use expensive $CO_2$ production units. The use of a unique strain of mycelium with the proprietary substrate prepared according to precise laboratory techniques optimizes $CO_2$ production. The $CO_2$ enhancements are released through a micro-porous breather patch filter. Depending on the size of ExHale® bag selected, the product may be stored for 90-120 days prior to the removal of the external clamp and will provide reliable production of $CO_2$ for a minimum of six (6) months to various size environments. In order to maintain assured viability of the mycelium organisms, the present invention demonstrates that it is preferred to inoculate and incubate the mycelium within the desired substrate and then cut off the oxygen supply to the thriving organisms and their food growth substrate so that they can survive the suffocation caused by the sealing of the mycelial mass away from the oxygen source of the air exchange portal. Additional experience shows that the isolation of the mycelia with only their spawn colonization nutrient substrate will allow mycelia to survive even when suffocated by the external seal. Then, when the mycelia are combined with the more robust, bulk food substrate the mycelia will begin to colonize and thrive in an expected manner. The present invention successfully controls the artificial environment of a human-isolated mycelium strain even at room temperatures when mycelia are away from a food source. The present invention succeeds in controlling the artificial environment in order to properly prepare the mycelium to produce the highest levels of $CO_2$ possible and yet provides for the planned intervention to inhibit or delay the respiration of the mycelia, and therefore the by-product of $CO_2$. The artificial inhibition of the respiration of the prepared mycelium is purposefully ended by the consumer of the product when she removes the external seal. The many instances of specific human intervention and additional ingenuity supplied by the inventors succeed in manipulating a seemingly natural process and creating a controlled, inventive product that can enhance growing environments.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

DETAILED DESCRIPTION OF THE INVENTION

Figure 1:
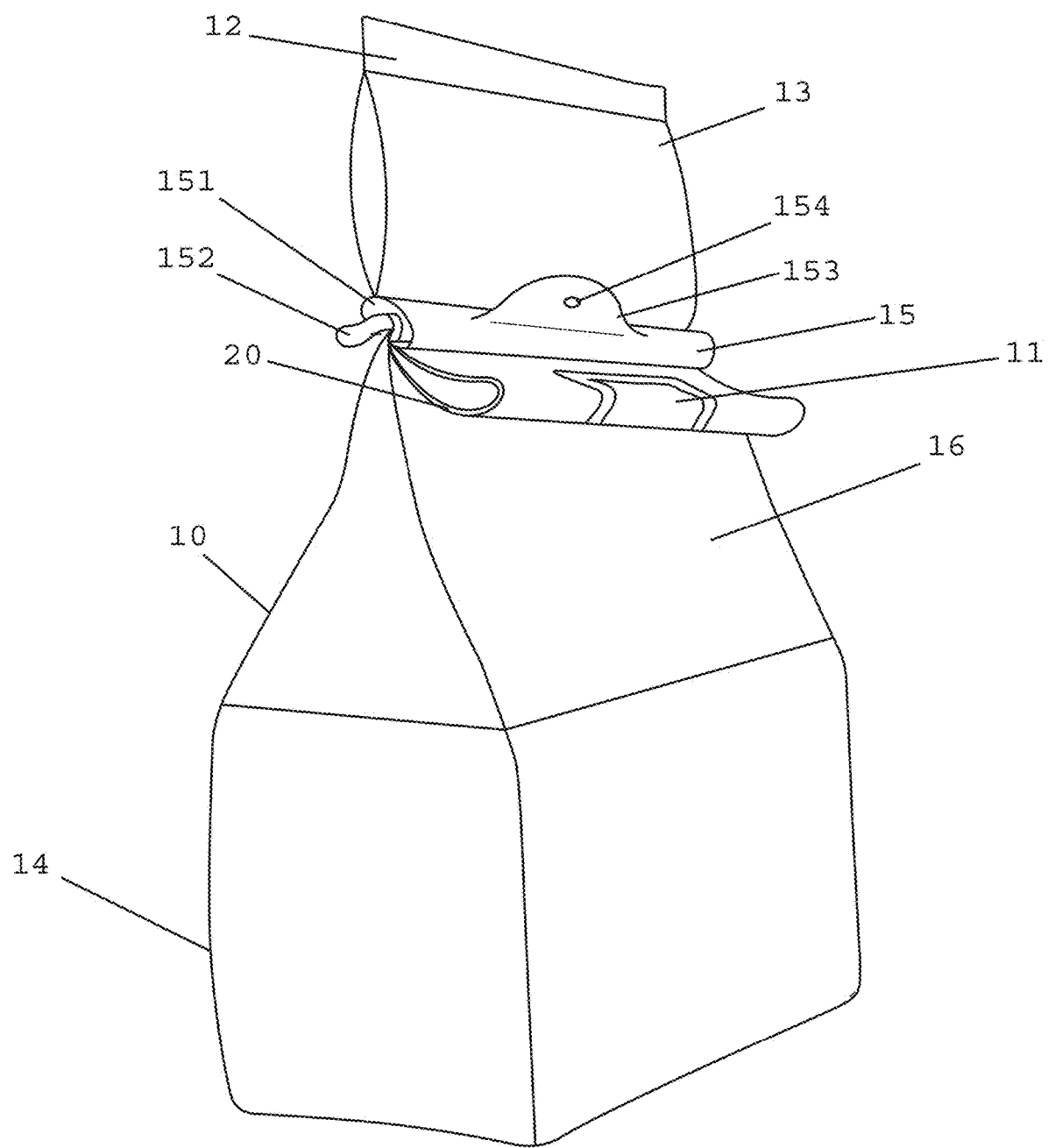
FIG. 1 is a front perspective view of a folded variation of the present invention where three chamber zones are created by one external sealing mechanism.
Figure 2:
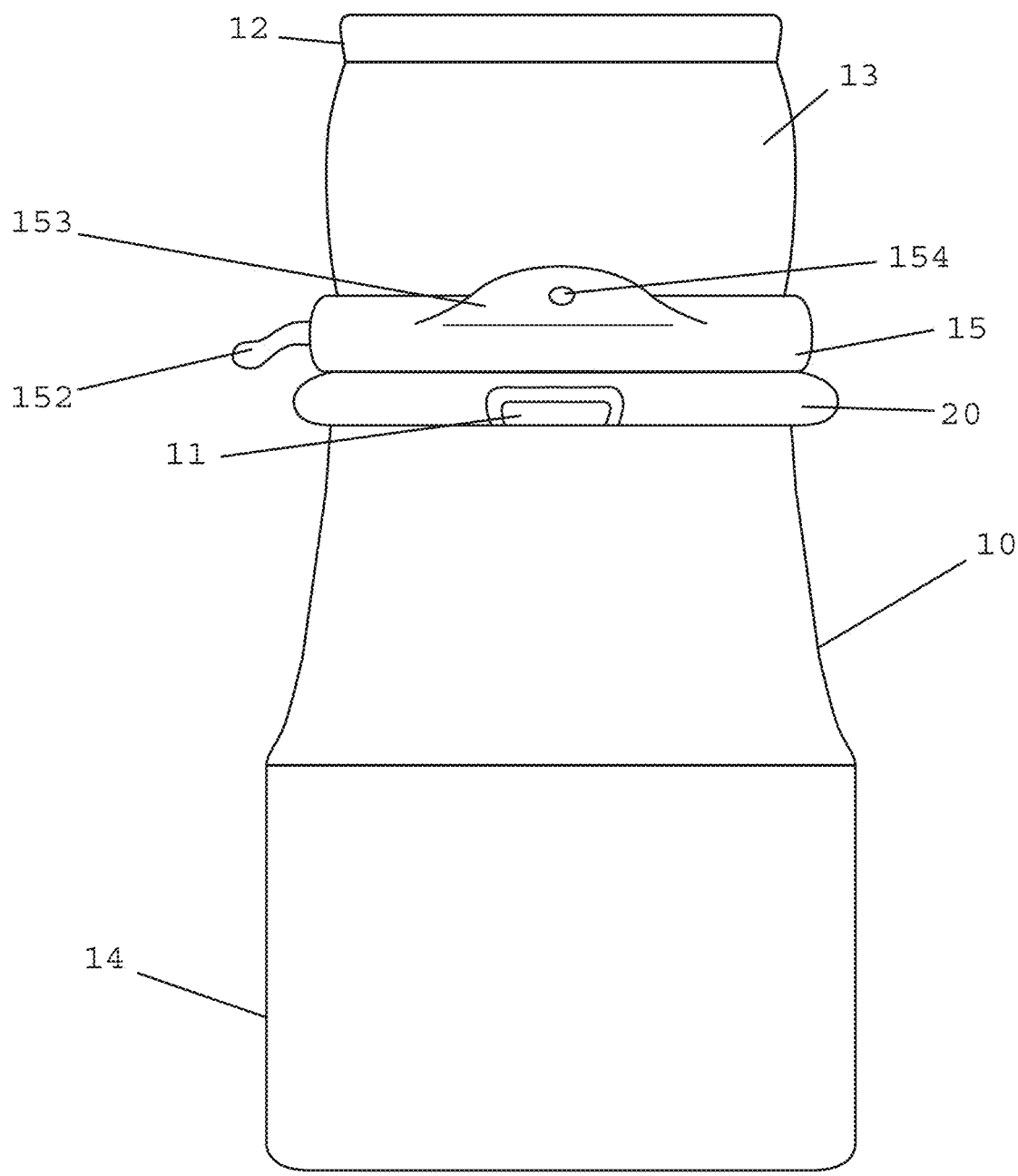
FIG. 2 is a front elevation view of FIG. 1.
Figure 3:
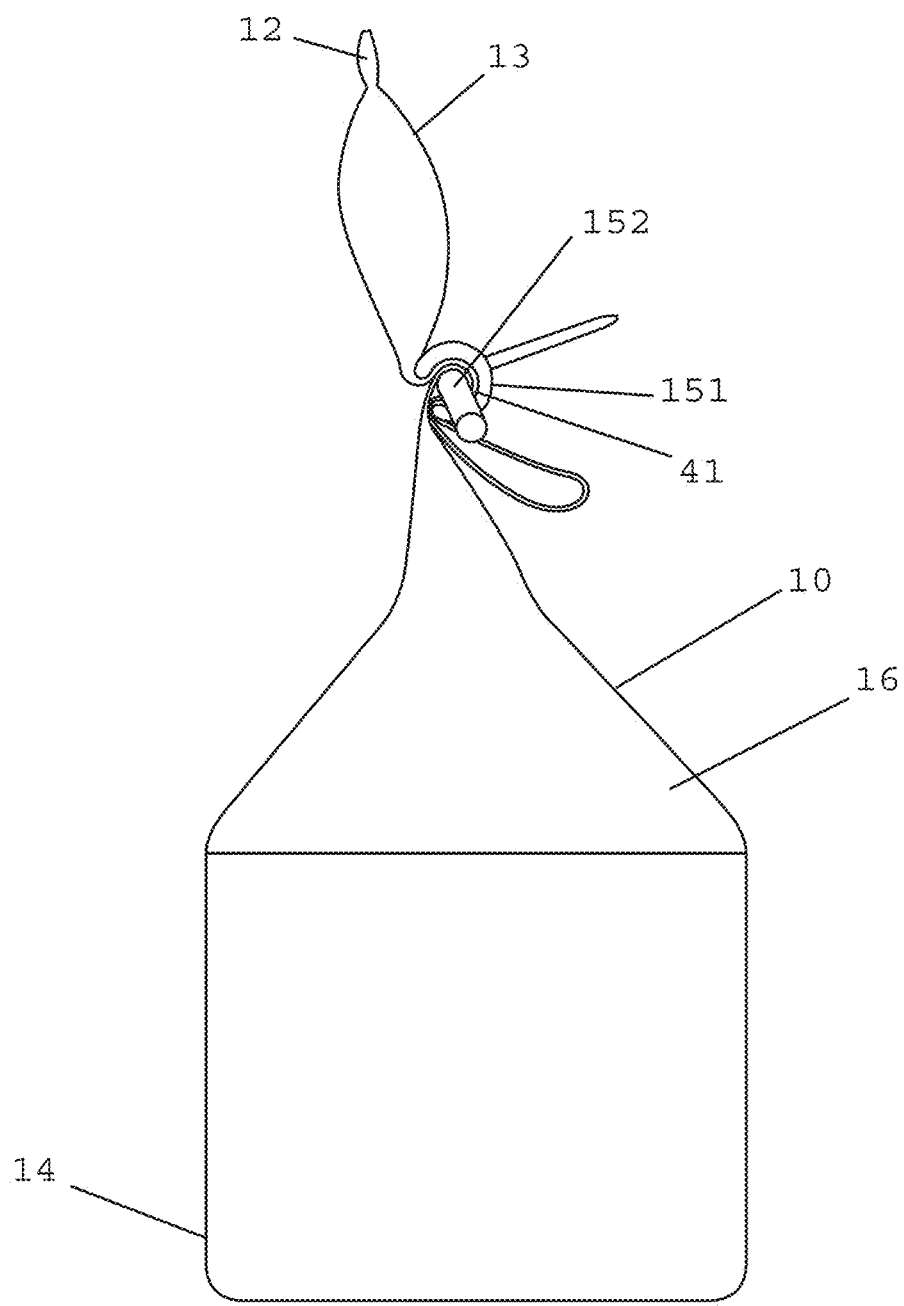
FIG. 3 is a side view of FIG. 1.
Figure 4:
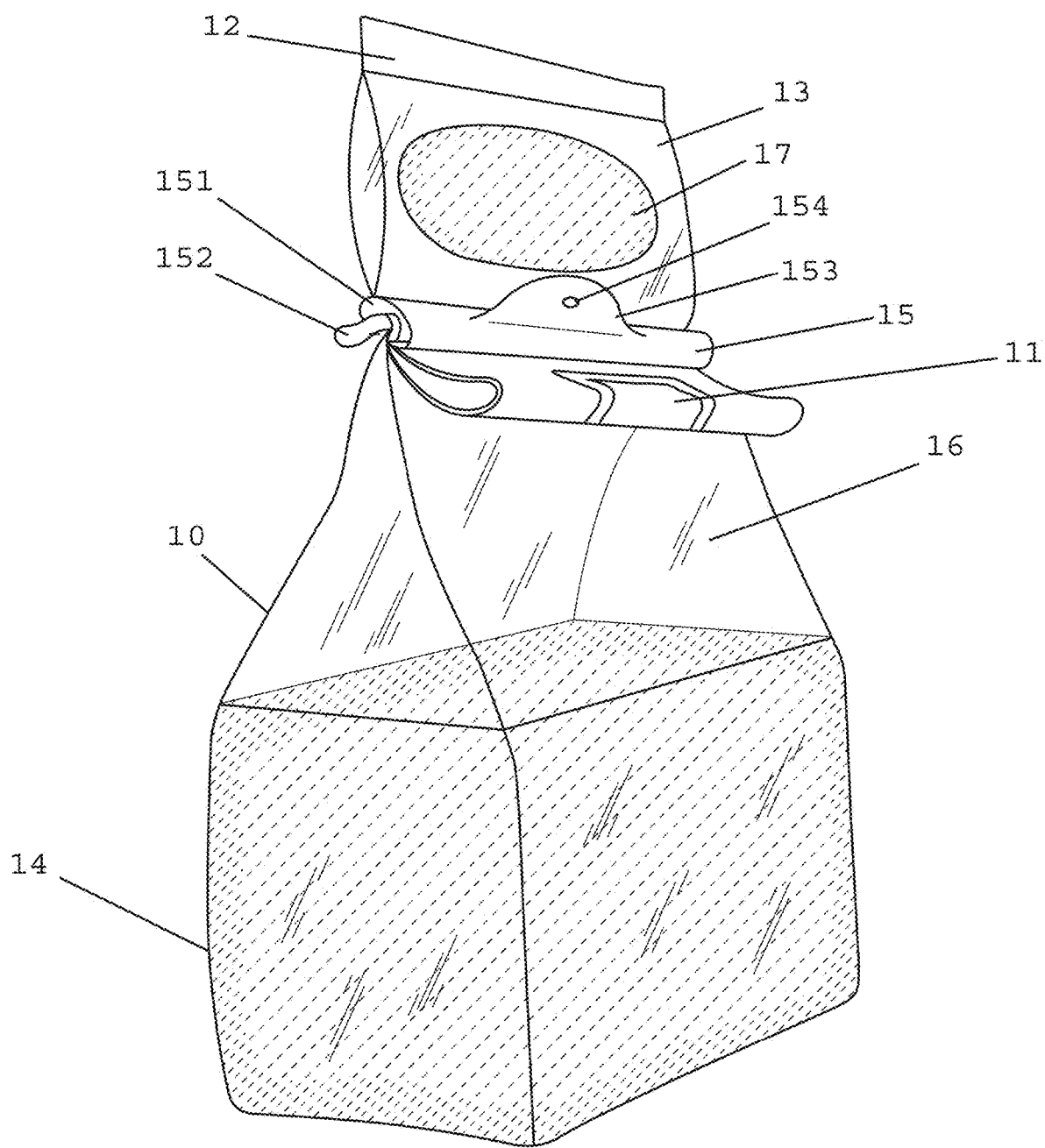
FIG. 4 is a front perspective view of another folded variation embodiment having the mycelia separated from the food growth substrate and three chamber zones created by one external sealing mechanism and also showing a transparent bag variation.
Figure 5:
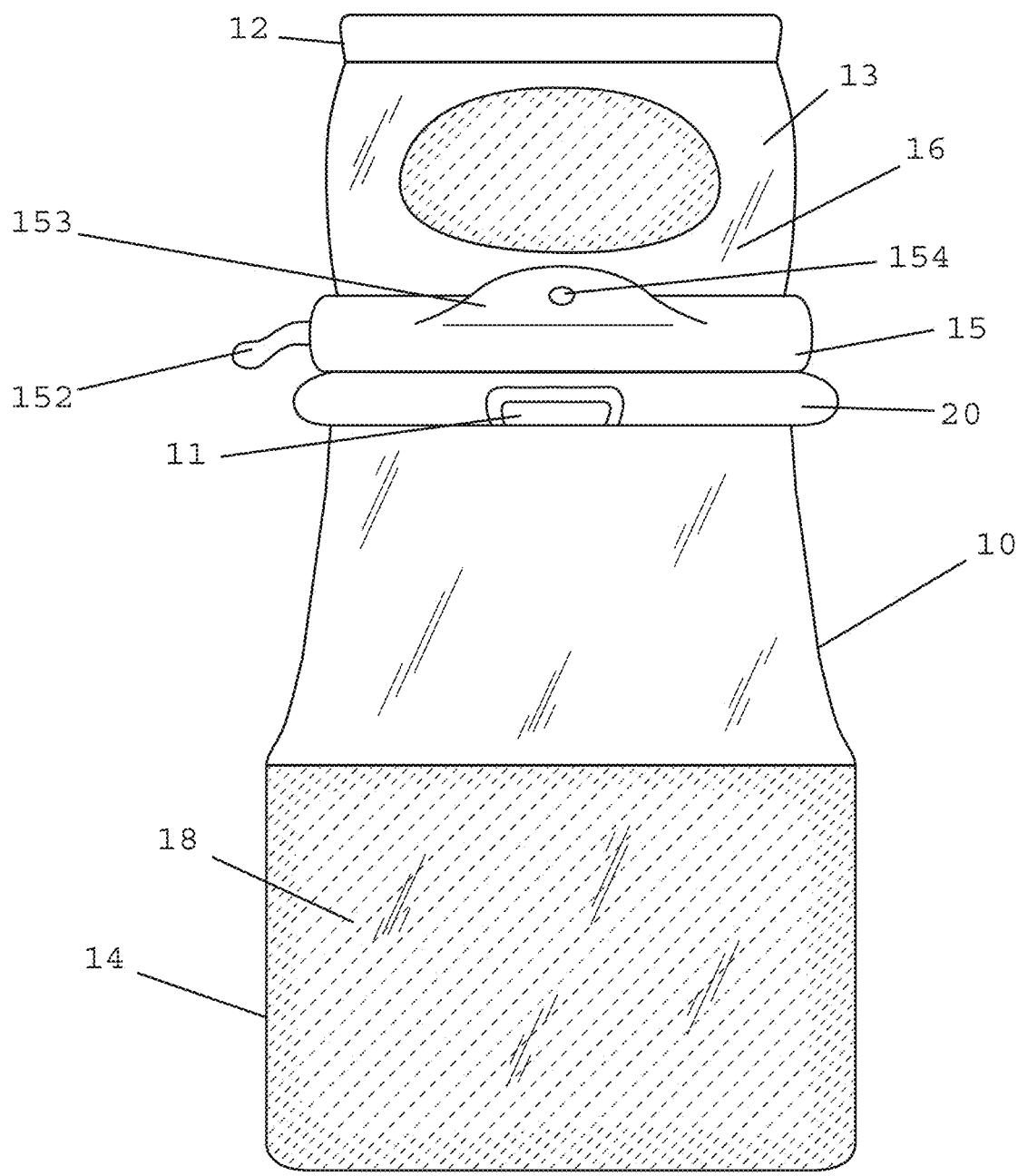
FIG. 5 is a front elevation view of FIG. 4.
Figure 6:
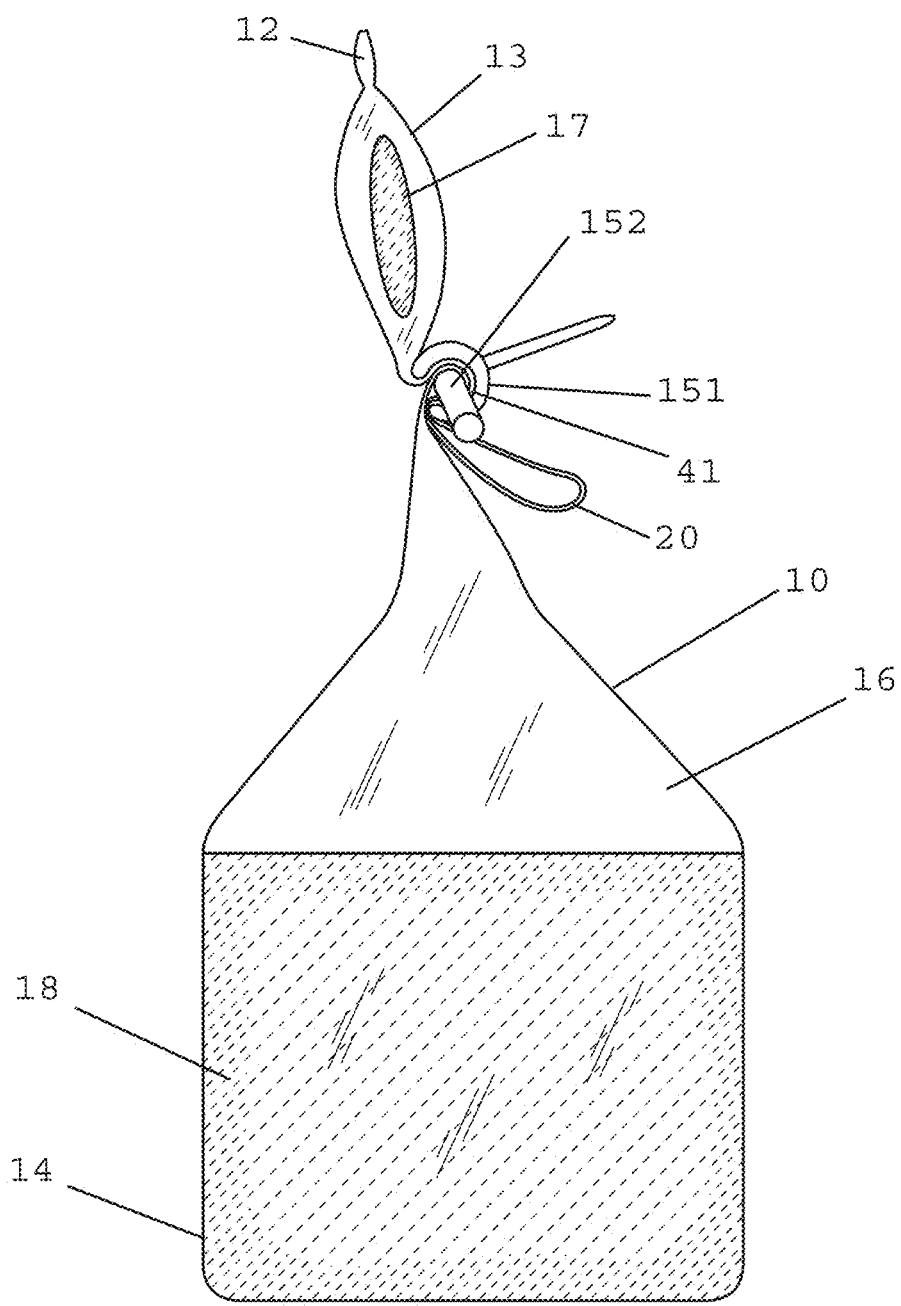
FIG. 6 is a side view of FIG. 4.
Figure 7:
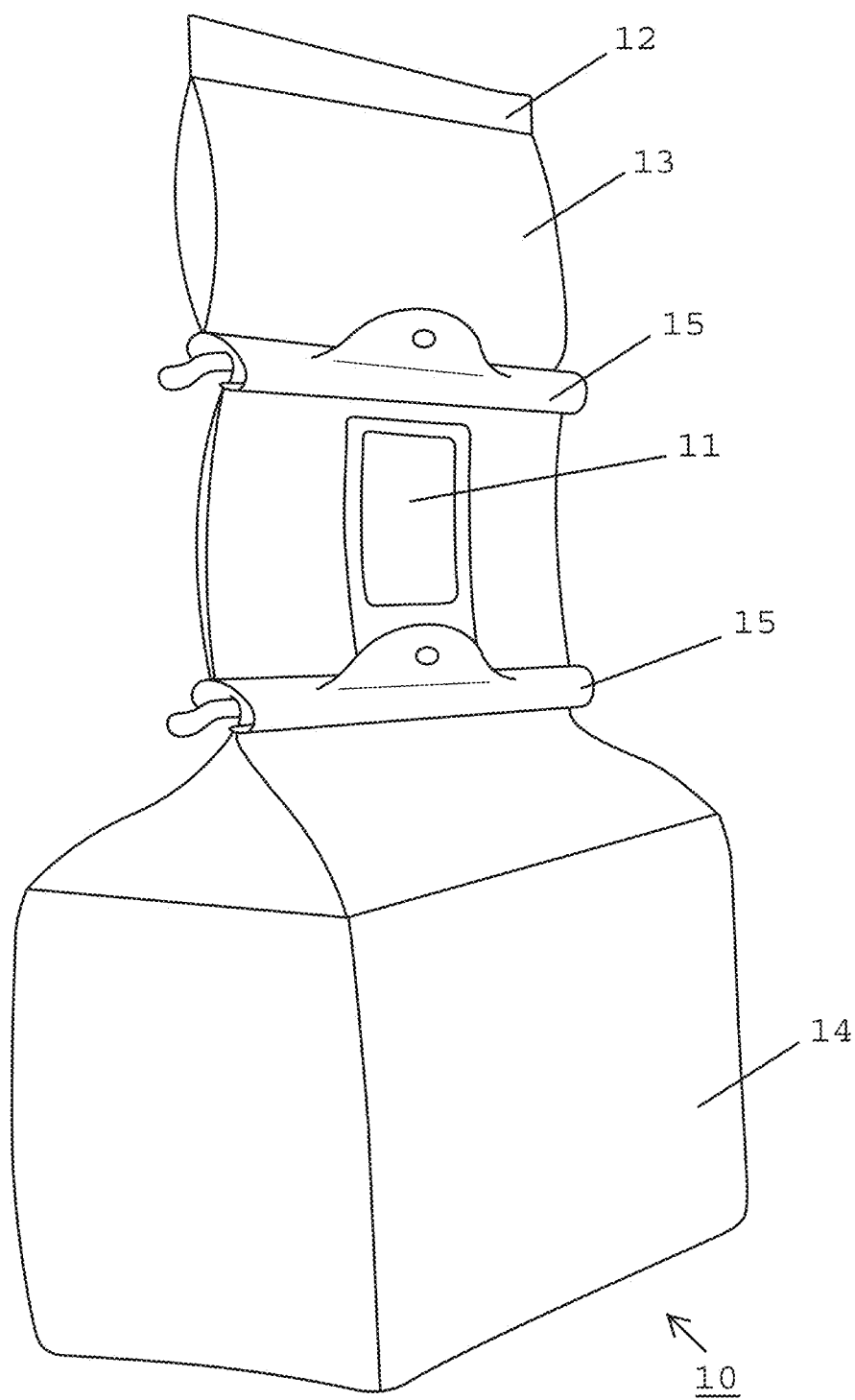
FIG. 7 is a front perspective view of an embodiment having two external sealing mechanisms creating three chamber zones.
Figure 8:
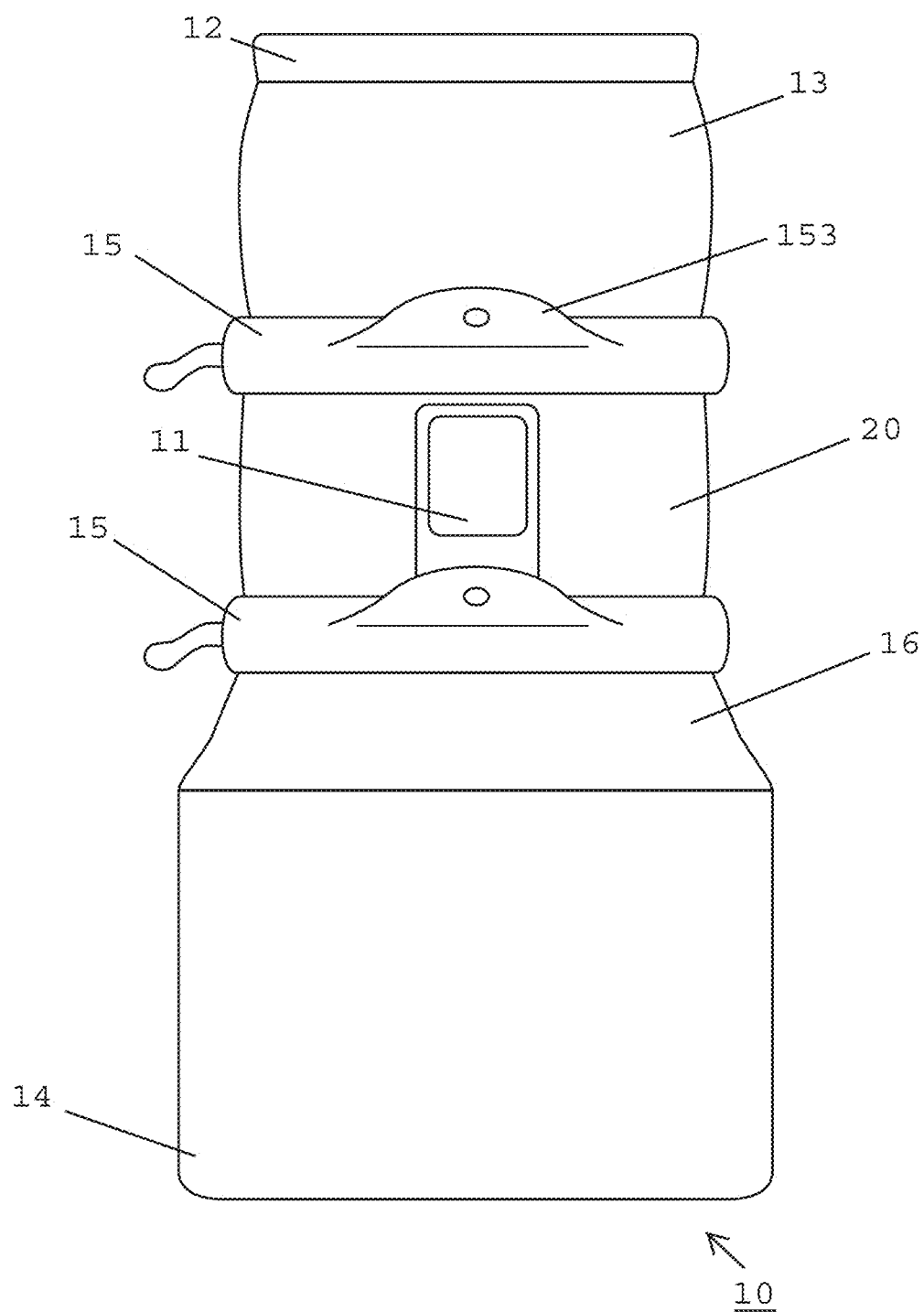
FIG. 8 is a front view of FIG. 7.

In order to harness and selectively supply supplemental $CO_2$ to an indoor growing environment, this consumer product uses a mycelium-inoculated bag, prepared as disclosed herein, to offer on-demand activation of $CO_2$ supplementation. With reference to FIG. 1, the present invention's preferred container, a bag 10 is folded near its air exchange portal 11 and a single external sealing mechanism 15 is applied to the overlapping bag section above and below the air exchange portal 11 to create a separation seam, thereby cutting off the air supply provided by the micro-porous air-exchange portal ("breather patch") 11. When the removable sealing mechanism 15 is applied according to FIGS. 1-6, it effectively creates three chambers also called zones or "sections" in the bag. The chamber zones may be empty or filled and thus be viewed as being only two chambers, or three. The chamber zones in the preferred embodiment are the lower chamber 14, the upper chamber 13, and the middle chamber 20. In the embodiment illustrated in FIGS. 1-6, the lower chamber 14 holds the food substrate 18 and the upper chamber 13 holds the mycelium spawn 17, and air exchange is taking place through the microporous air exchange portal 11 disposed in the middle chamber 20.

With continuing reference to FIGS. 1-6, the lower chamber zone 14 (also called the receptor zone 14 in other embodiments) begins at the bottom of the bag which has been previously sealed. See FIG. 16. In the preferred embodiment, this seal is created by the bag's manufacturer (e.g., Unicorn™ bags). The lower chamber zone 14 is filled with any of (1) the mixture of the mycelium spawn 17 and the food substrate 18 prepared according to the present invention, or (2) only the food substrate, or (3) only the mycelia spawn substrate, or (4) in some cases this lower zone could be empty. The lower chamber zone 14 may include a buffer space 16 and the lower chamber zone ends at the temporary seal created by the introduction of the external sealing mechanism 15 applied to the exterior of the bag 10. The upper chamber zone 13 begins at the temporary seal created by the external sealing mechanism 15 and ends at the bottom of the top seal 12 of the bag 10 which is created according to the procedure described herein. In the embodiments shown in FIGS. 1-6, the lower chamber zone 14 ends and the upper chamber zone 13 begins at the intersection of the folded bag and the clamp 15. The upper chamber zone 13 is filled with any of (1) only the mycelia spawn culture, or (2) nothing, or (3) only the food substrate, or (4) the mixture of the mycelium spawn 17 and the food substrate 18 prepared according to the present invention. In all cases, the various zones, even when described as "empty" may exchange air flow with the environment when that particular zone is in communication with the air exchange portal 11 or due to minor leaks in the seal. The middle chamber zone 20 shown in FIGS. 1-6 is empty but is in communication with the air exchange portal and is thus experiencing air flow filtered by the breather patch 11. As shown in FIGS. 1-6, the combination of folding the bag and applying a single clamp creates the middle chamber zone 20 apart from the lower chamber zone 14 and the upper chamber zone 13 and their respective contents. The middle chamber zone 20 begins and ends at the same intersection where the lower chamber zone 14 has ended and the upper chamber zone 13 has begun.

Referring to FIGS. 7-14, more than one external sealing mechanism 15 is applied to the bag 10. In this example, two sealing mechanisms 15 are applied. One sealing mechanism 15 applied to the exterior of the bag 10 above the breather patch 11 forms the bottom of the upper chamber zone 13 and also forms the top of a middle chamber zone 20. A second sealing mechanism 15 has also been applied, in this example, below the breather patch 11. The second sealing mechanism 15 here creates the bottom of the middle chamber zone 20 and the top of the lower chamber zone 14. Again, respective buffer spaces 16 are illustrated particularly in FIGS. 10-14.

Figure 9:
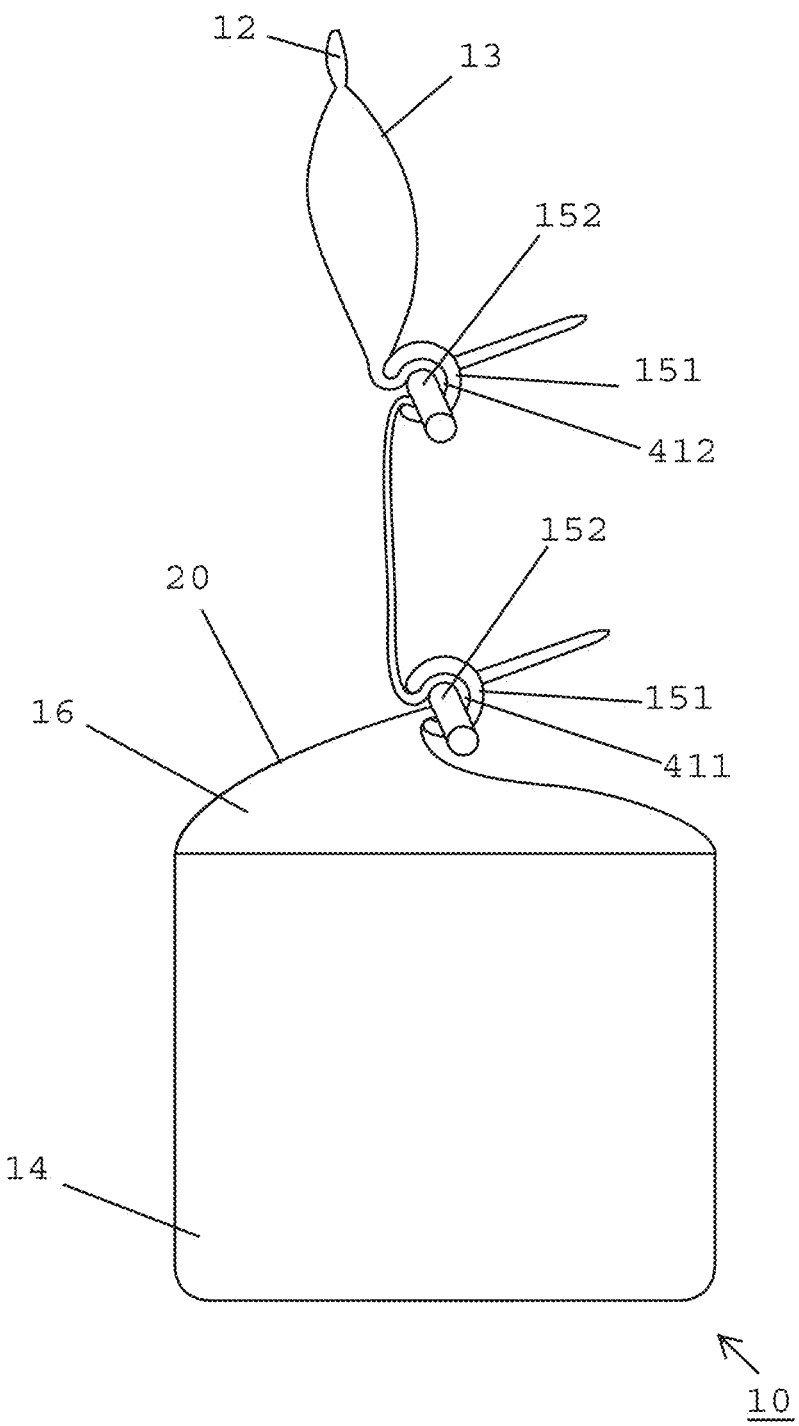
FIG. 9 is a side view of a FIG. 7.
Figure 10:
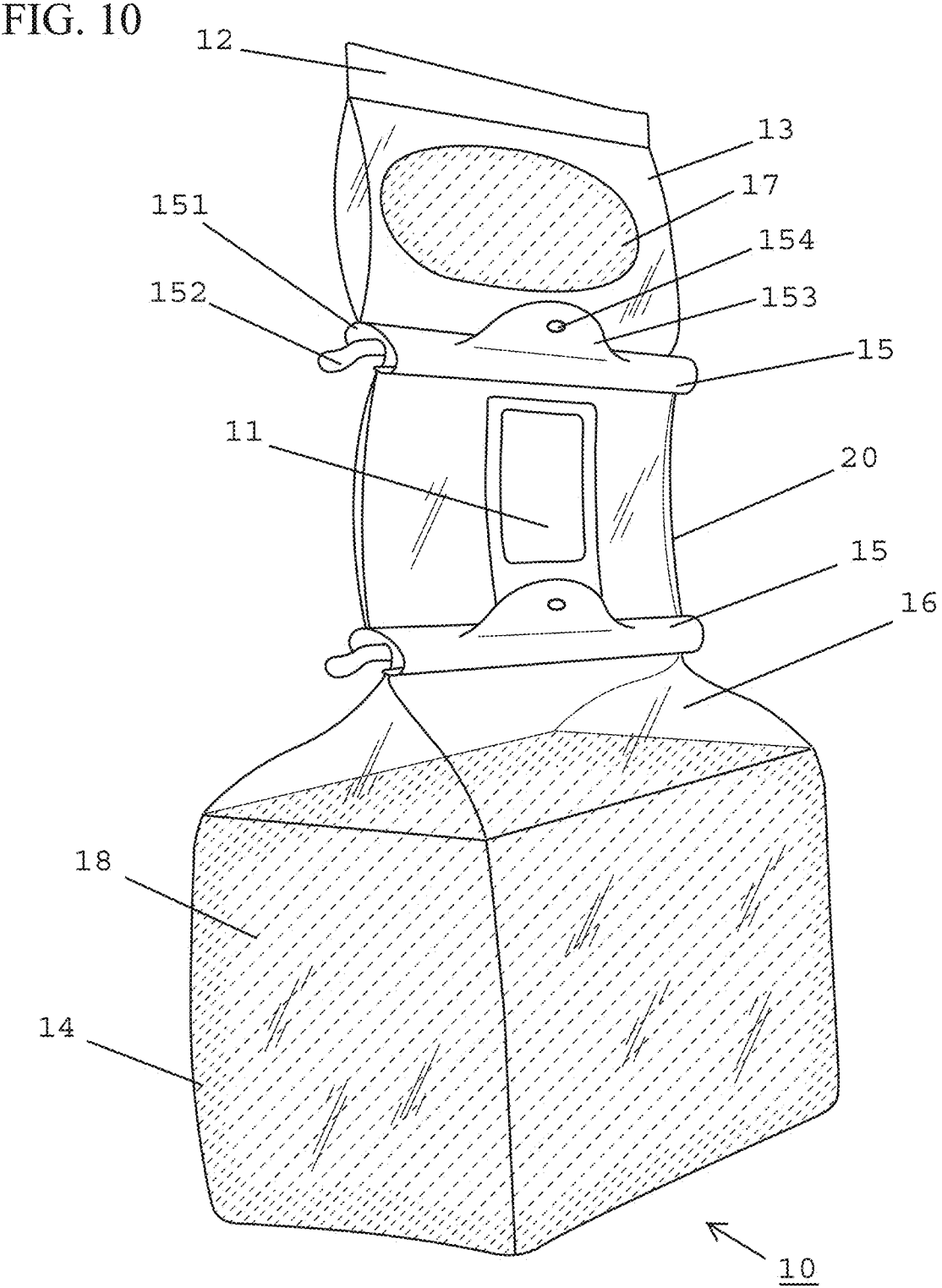
FIG. 10 is a front perspective view of a transparent bag version of a multi-sealing mechanism embodiment of the present invention demonstrating the separation of the mycelia from the food growth substrate.
Figure 11:
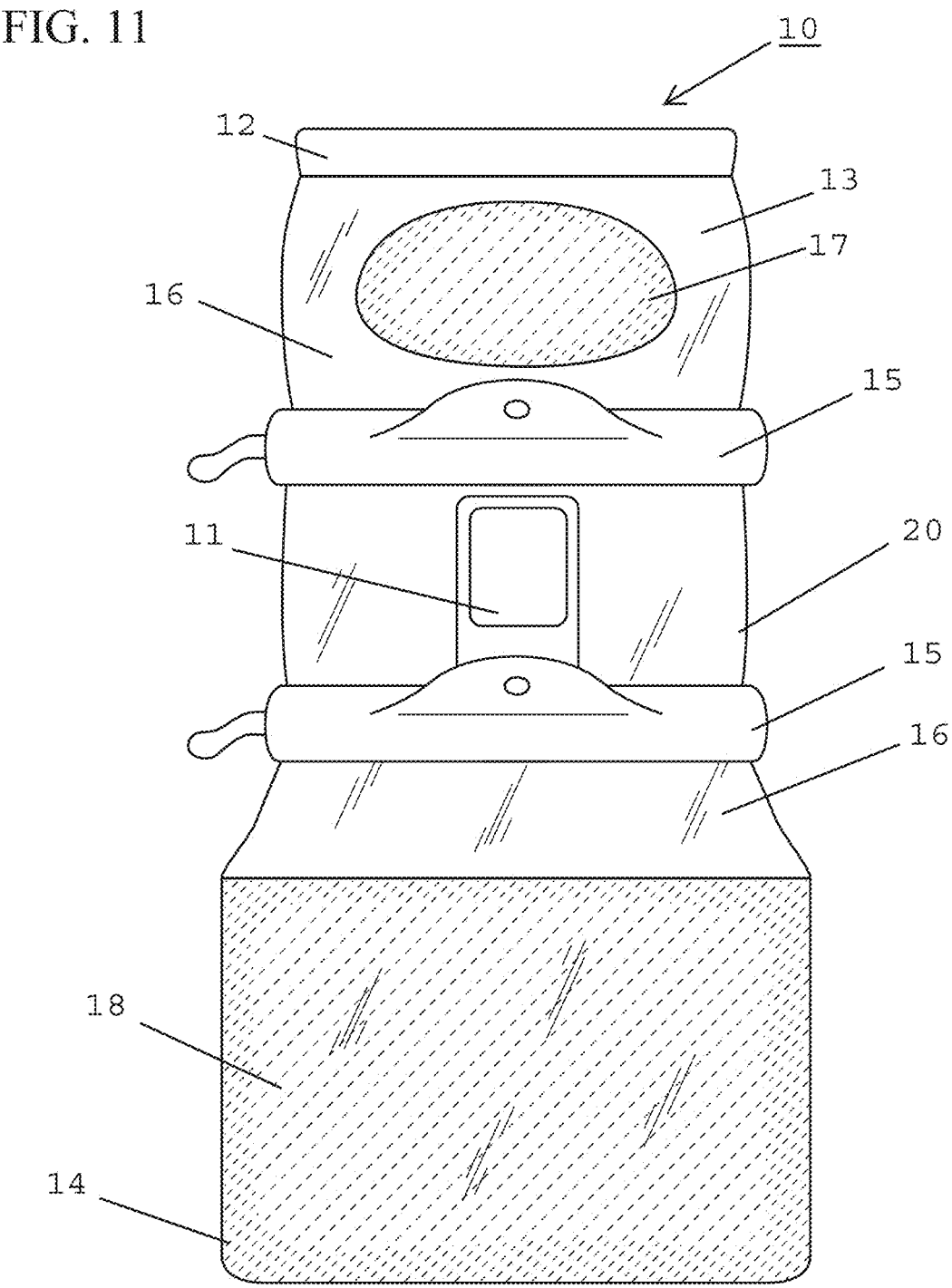
FIG. 11 is a front view FIG. 10.
Figure 12:
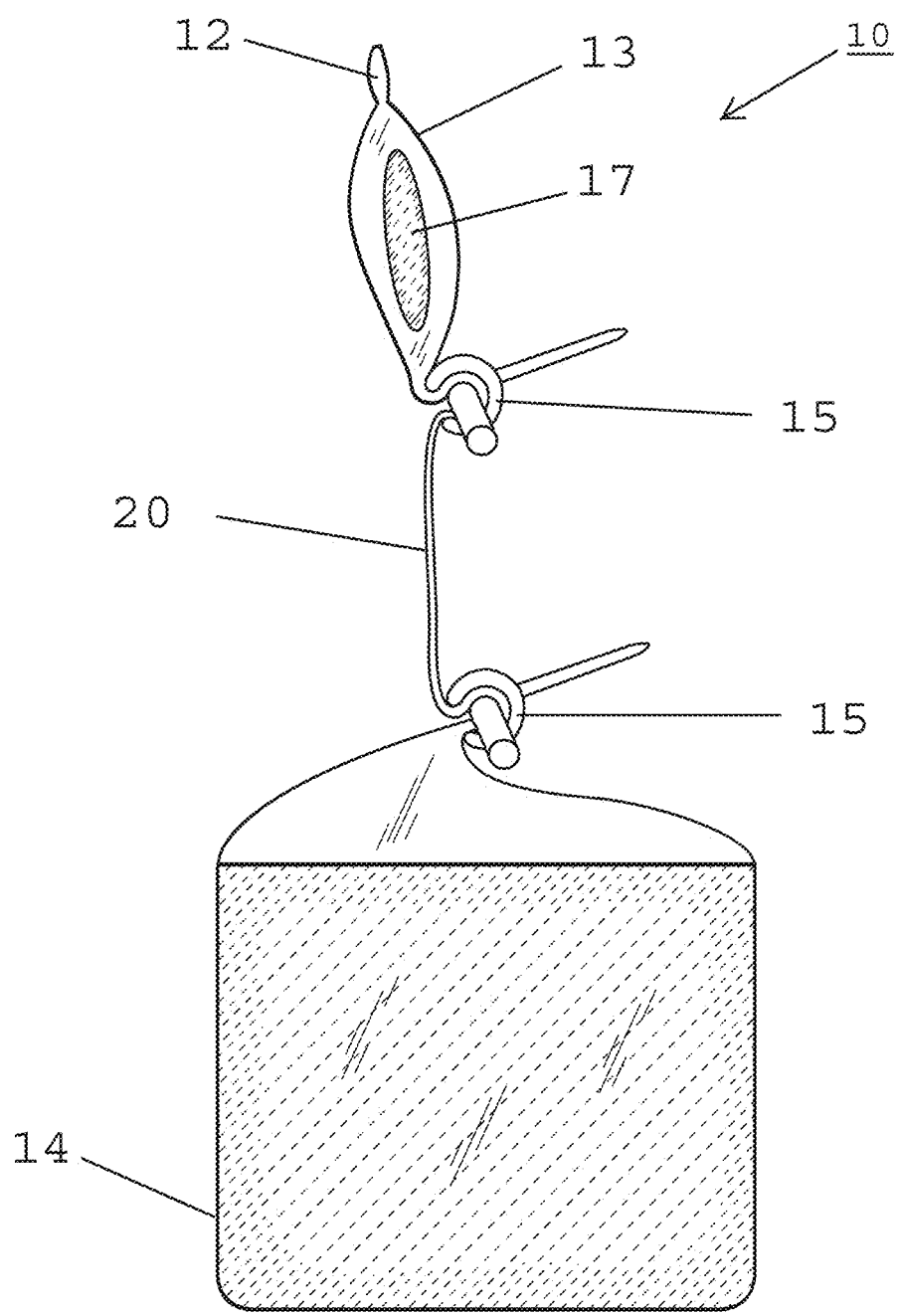
FIG. 12 is a side view of FIG. 10.
Figure 13:
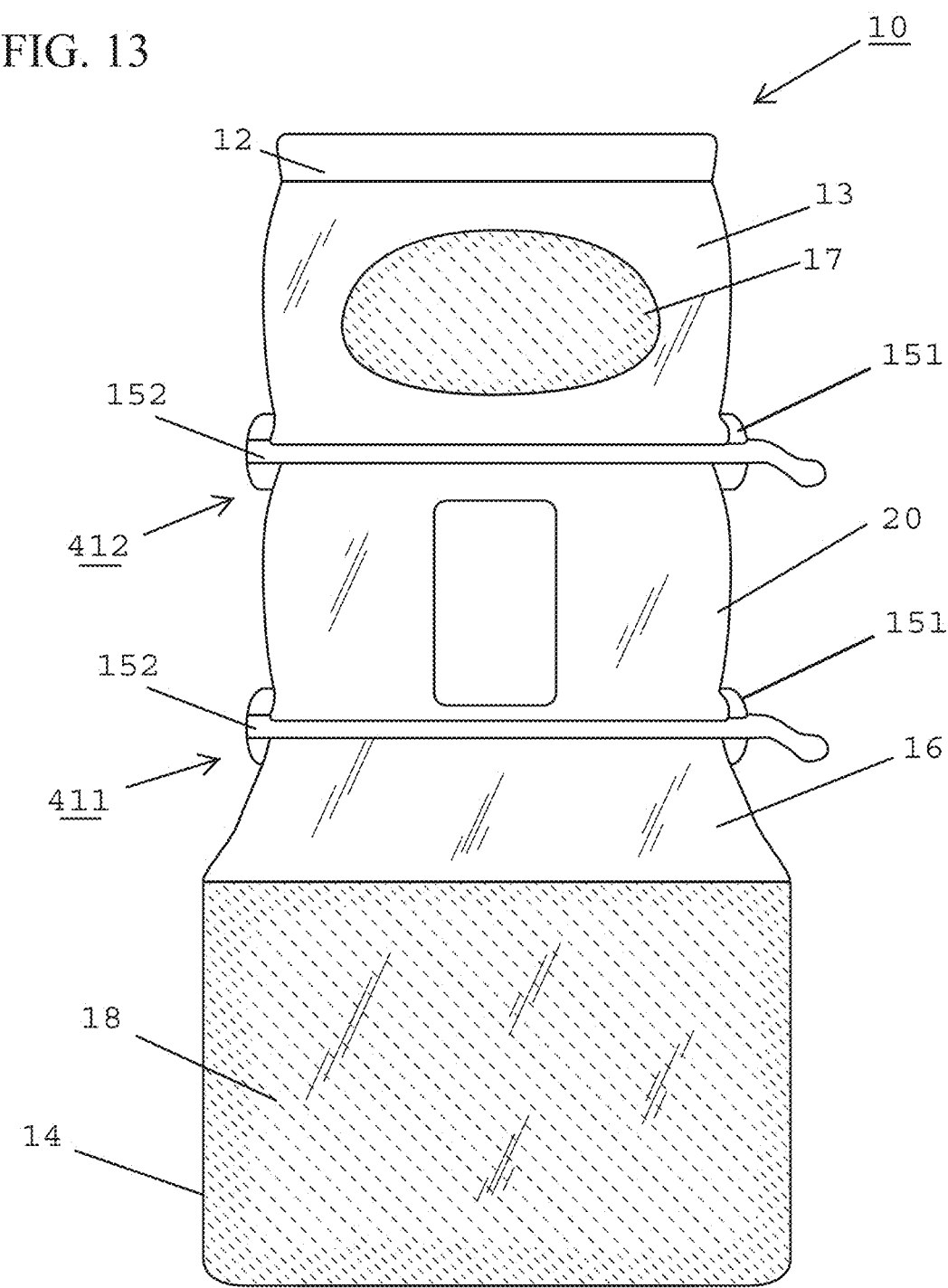
FIG. 13 is a rear view of FIG. 10.
Figure 14:
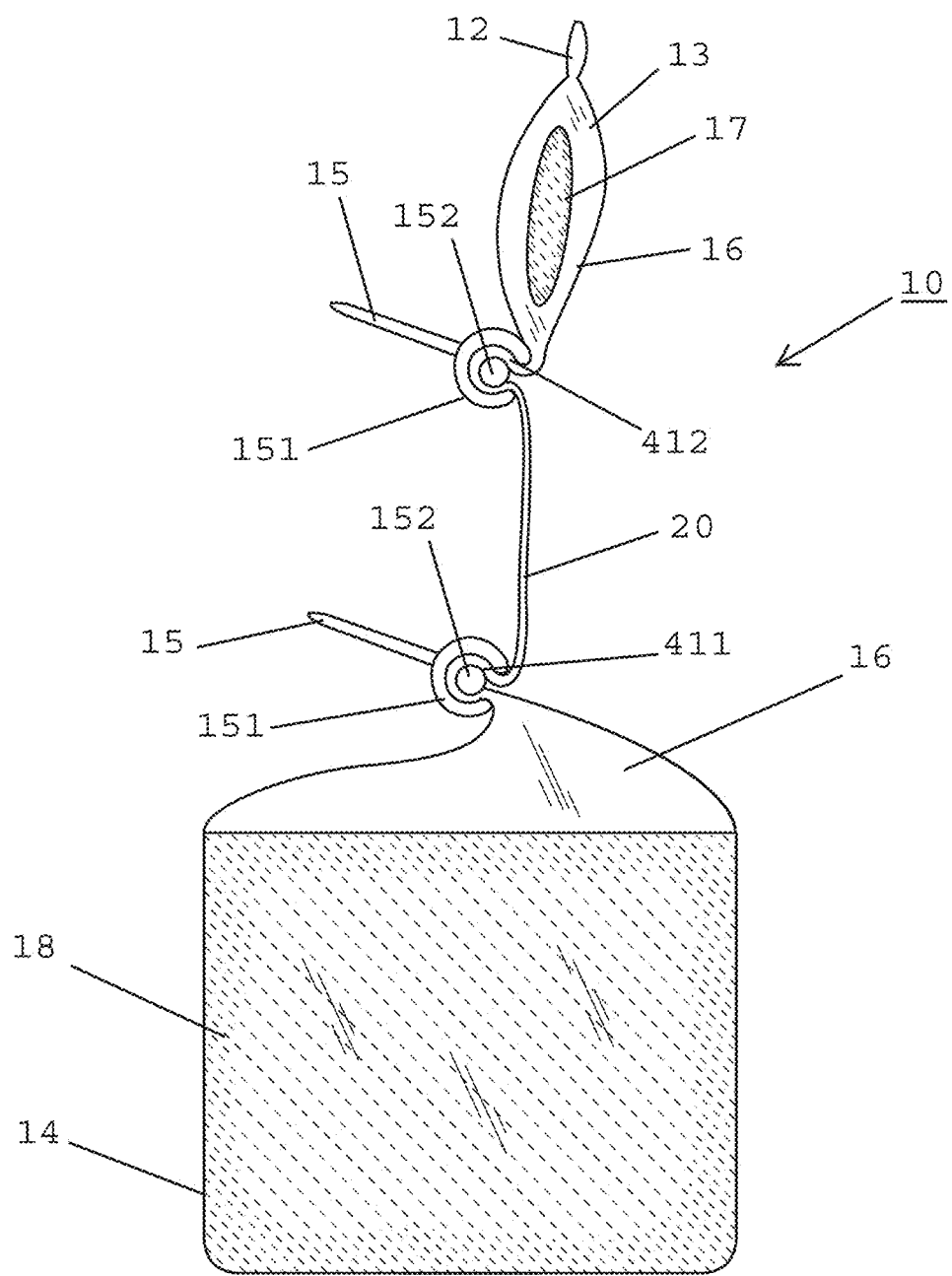
FIG. 14 is a second side view of FIG. 10.

In FIGS. 4-6 and 10-14, the spawn pod 17 is shown between the separation seam 41 and the upper seal 12 of the transparent bag. The spawn is compacted near the top seal 12. In both the fold variation and the dual clamp variation, the breather patch 11 is isolated from the spawn 17 and is also isolated away from the food substrate 18. Shown in FIGS. 4-6, the fold variation creates a middle zone 20 when the bag is double-folded into the single clamp 15 which forms the seal 41. In the dual sealing mechanism variation shown in FIGS. 10-14, the breather patch 11 is above the first separation seam and below the second separation seam and a substantially empty portion of the bag 10 creates a dead air space 16 above the lower receptor area 14 and another substantially empty portion also occurs just below the upper chamber zone 13. FIGS. 9, 12 and 14 are side views showing these variations and particularly showing the seals 41, 411, 412 created in the bag 10. FIG. 13 is the rear view of the dual seal version again illustrating the first seal 411 and the second seal 412. The drawings illustrate the product standing erect, but in the natural resting position of the product without outside influences such as a hanger 153, the top of the bag may likely flop over to one side or the other. The dead air space 16 allows for extra room to keep the mycelial spawn pod 13 from resting too closely to its food supply in the receptor zone 14. The zones are separated by a separation seam 41 which in addition to inhibiting air flow between the chambers also inhibits mycelial transfer between the distinct zones. Mycelia are known to be diligent and grow toward any nearby food supply but even if the mycelia do grow toward the food supply during shipment or before inoculation, the suffocating conditions and the dead air zone 16 will delay true inoculation and mycelial growth.

Alternative embodiments allow for separation seams to be placed at other locations to create additional zones. In some instances, it may be necessary or desirable to place the separation seam 41 below the breather patch 11 with the living organisms on the same side of the seal in order to allow the mycelial spawn 17 access to air to ensure survival prior to inoculation. Depending on the strain used in the mycelial mass 17, the species of organism may require more oxygen than the amounts coming through the substantially air-tight seal 41. By placing the separation seam 41 below the breather patch 11 in this embodiment, the food substrate 18 in the receptor zone 14 would be substantially without oxygen, but this will not impact the inorganic material awaiting inoculation. Again, a region of dead air space would still create a buffer 16 between the zones.

In another embodiment, the separation seam 41 may be formed over top of at least a portion of the breather patch 11 or the breather patch may be partially obstructed by one or more sealing mechanisms or folds. By placing a separation seam 41 over at least a portion of the air exchange portal 11, each section or chamber of the bag 10 sharing a portion of that portal 11 is permitted to exchange micro-porously filtered air with the ambient surroundings. This embodiment may benefit strains of spawn 17 which require some additional access to oxygen beyond what may seep through the seam. This embodiment will still slow growth of the mycelia by providing only a partial air access through the portal 11. In some circumstances, this partial suffocation embodiment will have distinct advantages over the complete suffocation embodiments.

FIGS. 1-14 each illustrate the working components of one example of an exterior sealing mechanism 15, showing the preferred design utilizes a clamping mechanism or other flat surface that slides over a bag to achieve a seal 41 that separates the container 10 into at least three zones. FIGS. 3, 6, 9, 12 and 14 illustrate side views of the clamp 15 in use when folded or for multiple clamps at various points on the bag 10. These viewpoints show the preferred means by which a separation seal 41 is created by an external clamp 15. The clamp 15 has a first outer wall 151, which in this case looks very much like a C-clamp. Then, in this case, a second inner wall 152 is formed by a rod sized to fit within the C-clamp shaped first wall 151. A portion of the bag 10 is slipped, squeezed, crimped, or clamped between the first wall 151 pressing against the second wall 152 forming a separation seal 41. Any similar crimping or sealing mechanism may be utilized. When the bag is folded in the variation to create three chambers with one external sealing mechanism, the bag is folded back on itself and overlapped to pass through and be squeezed, crimped, or clamped between the first wall 151 pressing against the second wall 152. The single clamp 15 creates three chamber zones as shown in FIGS. 1-6.

Figure 15:
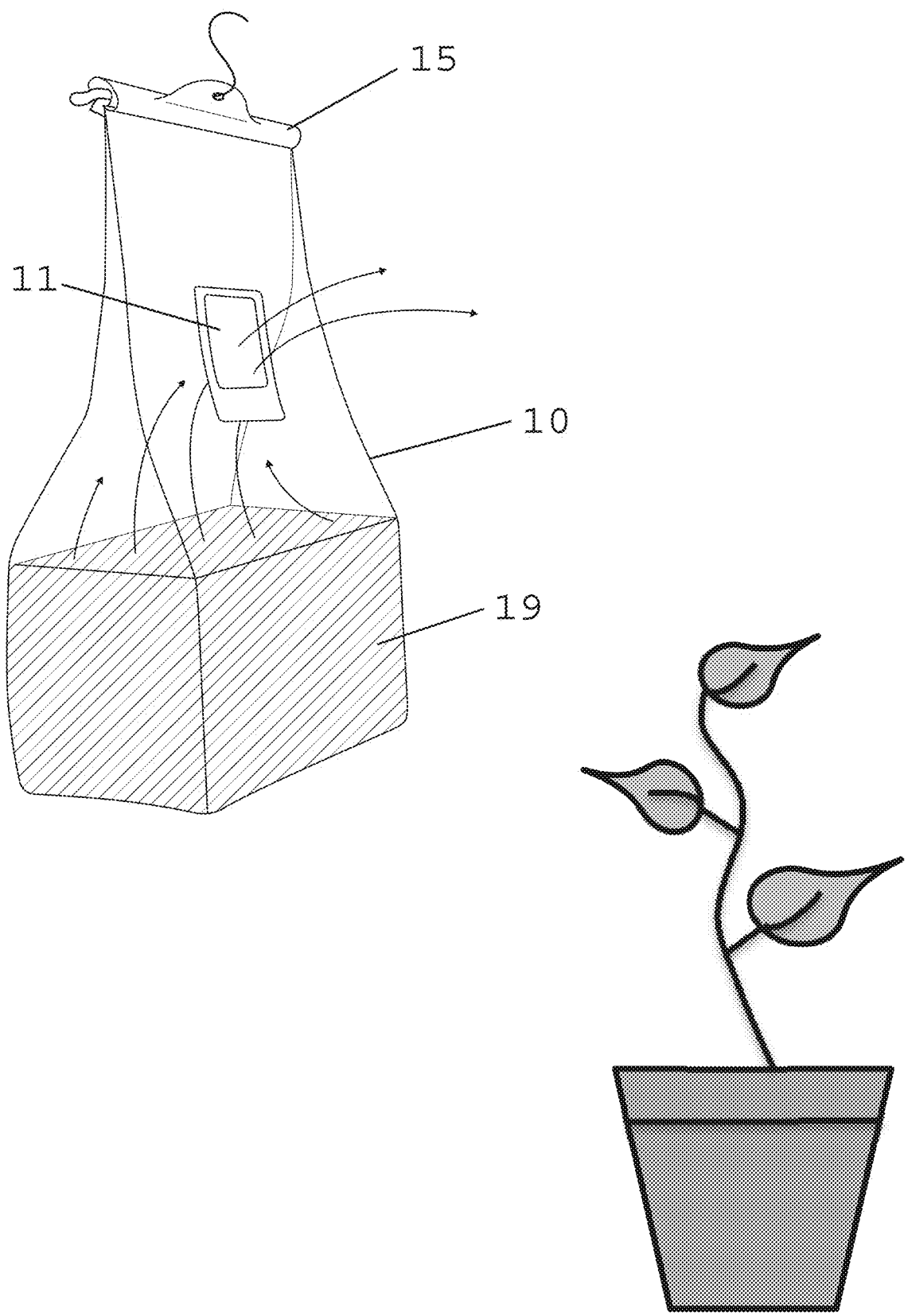
FIG. 15 is a front perspective view of present invention schematically illustrating the movement of carbon dioxide out of the bag during use.

The preferred embodiment will be prepared by specific procedures generally comprising the processes of creating and using an isolated fungi growing environment inside a larger indoor plant growing environment whereby the invention allows the user to enhance $CO_2$ exposure for the plants in the larger growing area. In order to create an optimum, isolated, and sterile fungi growing environment which will optimize and extend the usefulness of the device to generate and expel $CO_2$ into a plant growing environment, the following steps are performed using standardized, aseptic laboratory techniques:

growing out a tissue culture of an isolated, pure fungal strain on a petri plate;
   creating a spawn of the cultured fungus in a larger vessel with a sterile nutrient source;
   preparing a bulk substrate;
   filling a filtered, heat-tolerant bag with the bulk substrate;
   sterilizing the bulk substrate and bag;
   cooling the bulk substrate and bag;
   optionally inoculating the substrate in the bag with the spawned fungus to create a mycelial mass which is allowed to rest and acclimate to the transfer or applying one or more external sealing mechanisms to create zones for selectively filling with mycelial spawn or food substrate according to this invention;
   sealing the top of bag with a seal such as a heat seal;
   optionally incubating the bag's mycelia or mycelial mass;
   applying any additional, desired removable clamps not applied in the prior steps to the exterior of the bag product consistent with the objectives of the present invention; and
   distributing the product to consumers with instructions to remove any external seals from the exterior of the bag in order to restore the full oxygen supply to the mycelia and reinitiate the growth in the artificially environment and take any additional steps to prepare and use the product such as mixing the mycelia with the food substrate or applying the sealing mechanism as a hanger and employing the by-product of the processes to supplement and enhance $CO_2$ in an indoor plant growing environment as depicted in FIG. 15.

Alternative embodiments of the consumer product described herein may have a slight variation in preparation beginning after the cooling phase.

When working with mycelial cultures to prepare the present invention, all work must continually be done using standardized laboratory protocols and procedures to maintain sterile working conditions. The laboratory area must be completely indoors, and enclosed. The lab area is also ULPA/HEPA filtered to insure a contaminant free environment. These filters remove 99.999% of dust, pollen, mold, bacteria and any airborne particles with a size of 100 nanometers (0.1 μm) or larger. Climatic conditions are controlled. Temperature is maintained at 70° F. (21° C.) and humidity levels are kept below twenty percent (20%).

To start the process of mycelial growth, a specific, pre-selected and cultured, pure strain of fungus is introduced to an agar medium to grow from spores or tissue culture. After a long and vigorous process, one purified strain of Turkey tail (*Trametes versicolor*) was developed to be the pure strain fungus of preference. This mycelial strain produces little or no primordia but has more vigor and therefore produces more $CO_2$ for a longer period of time. The beginning phase of the process is to start a population of fungi from a purified tissue culture by spreading cells, in accordance with standard laboratory, aseptic methodologies, onto petri plates containing agar. Agar plates with the master cultures are prepared by using sterile petri plates that have been filled with Potato Dextrose Agar (PDA) and sterilized. The process begins with a petri plate, a Potato Dextrose Agar, water, and a tissue culture of the desired mushroom species. The Potato Dextrose Agar and water are mixed together and placed in the petri plate. These agar plates or master cultures are created by using sterile petri plates that have been filled with PDA and sterilized at 250 degrees Fahrenheit (121° C.) for one (1) hour. The agar and plate combinations are sterilized such as by autoclave and allowed to cool.

The cooled plates containing the agar are inoculated with the sterile transfer of spores or tissue by known laboratory procedures and protocols. For example, the protocol calls for first sterilizing the instrument used for the transfer with flame or other sterilizing agent followed by transferring a small amount of spores or tissue into said cooled agar and placing spores or tissue so that it comes in contact with agar in petri plate. Once contact is made, spores or tissue is left on agar and the instrument is removed and petri plate is covered and sealed. With incubation (at the desired temperature of 70 degrees Fahrenheit/21 degrees Celsius), growth of mycelium will be noticeable in 24-72 hours after spore or tissue transfer and will continue until a layer of mycelium covers the entire agar surface. Once the mycelium has colonized the plate it is time to move the mycelium to a more nutritious substrate.

Continuation of the steps in the process results in spawn growth production from the petri plate culture. The process begins with a sterile vessel (glass is suggested), nutrient-rich additives, water, and the culture from the petri plate prepared according to the present invention. Ideal nutrient additives may be cereal grains (e.g., oats, rye, milo, millet or similar grains). The nutrient additives and water are blended together and placed in the sterile vessel for sterilization. The sterilization process should be done with heat and pressure, such as by autoclave, and then allowed to cool. Optimally, the nutrient blend in the sterile vessel is sterilized such as in an autoclave at degrees Fahrenheit (121° C.) for at least one (1) hour. The combination is allowed to cool in a HEPA filtered chamber. Once cooled to approximately 75 degrees Fahrenheit (23.9° C.), the resulting sterile, nutrient rich blend is inoculated with the pure culture which was previously grown on the agar petri plates. After the mycelium is transferred to the cereal grains, the vessel is closed and incubated and the mycelium is allowed to grow out completely and populate the vessel. The result is the pure culture spawn used in later bulk inoculation.

For the purpose of $CO_2$ production inside the end-consumer product, the final, bulk food growth substrate is prepared according to specifically developed techniques which optimize the carbon/nitrogen (C/N) ratio. The substrate is fortified with more nutrients than normal mushroom substrates which allows for more, sustained $CO_2$ production over a longer period of time. To begin, a cellulose-based substrate such as but not limited to sawdust, more nutrient additives such as cereal grains, and water are blended to achieve a substrate with an optimal moisture content of approximately sixty-five percent (65%). While this is indicated to be optimal moisture content, it is typical to have ranges between sixty percent (60%) and seventy percent (75%). Other ranges (e.g., about 50%-80%) are known to maintain functionality, but are not ideal. For embodiments with food substrate in the lower chamber zone 14, this cellulose-based substrate is placed in a container 10 with a gaseous interchange portal 11. The container 10 is desirably a bag with a sealed bottom and an open top and which can withstand sterilization through autoclave. In the preferred embodiment, the bag 10 is filled with substrate—approximately to the half-way point or nearly up to the gaseous interchange portal means. The bag 10 preferably has a single air-vent with a microbial filter 11. After the bulk food substrate is placed in the bag, the combination is autoclaved. The process of sterilizing the bulk food substrate involves utilizing steam generated from a steam boiler that is piped into an autoclave and allowed to be put under pressure at a temperature of 250 degrees Fahrenheit (121° C.). Sterilizing the substrate under these conditions for at least one (1) hour is required. Preferred sterilization time is up to 10 hours at 15 pounds per square inch (PSI) (1.0549 kg/cm) or 250° F. (121° C.). The bag and the substrate are allowed to cool to approximately 75 degrees Fahrenheit (23.9° C.), or cooler. The cooling of the bulk food substrate is a vital step in this process. Cooling must take place in a HEPA filtered room that is positively charged with air. If this is not done the bagged substrate will become contaminated and will not be suitable for mycelium inoculation at any point. Once the bagged substrate is properly cooled to approximately 75 degrees Fahrenheit, it is optionally inoculated with the pure culture spawn prepared according to the present invention or if it has been prepared in the bag as described above it may be sealed into the lower chamber 12 by external sealing mechanism. Then, one or more seals may be created before the pure culture spawn is added to the upper chamber zone 13. When it is desired to place the bulk food substrate in a zone other than the lower zone, then the steps of sterilization may be separated from the bag sterilization, external seals may be applied, and the bulk substrate can be added into any chosen zone. In any case, the bulk substrate is suitable for spawn growth and because the media has been sterilized at every juncture, undesired bacteria, fungi, and other contaminants will be minimized. In any variation, the pure spawn culture, the bulk substrate or the combination is allowed to rest in the bag until the spawn have recovered from the transfer. Herein, the mixture of the bulk growth substrate with the spawn may be referred to as a mycelial mass.

Next, the top of the bag is folded over and sealed with a top seal 12. The bags are pressure tested (not shown) to insure a good seal. Only after the bag is sealed can it be removed from the HEPA filtered room since the breather patch 11 in the side of the bag will keep the contaminants out but allow the exchange of gases. A bag holding an already combined mycelial mass may be pre-incubated or immediately clamped. A bag holding mycelia separated from the bulk food substrate may also benefit from incubation, before or after clamping. Incubation can occur in the lab for a few hours, a few days or a few weeks, or desirably, when the techniques of the invention are employed incubation may occur during shipping, storing, shelving, or just prior to use in an indoor growing environment. If pre-incubation is used, one indication of the product being ready to receive the exterior sealing mechanism is when visible regrowth has occurred. Typically, after a few days mycelial growth is evident indicating a time to apply the separation seam/hanger, label, and date to each bag. The mycelium mass has its air flow restricted in the lower portion of the bag when the external seal is applied between the lower chamber zone and the air exchange portal. The mycelia separated from the bulk food substrate may also have its air flow restricted if an external seal is applied between the air exchange portal and any chamber holding the mycelia. In these instances, the separation seam/hanger slows the mycelial growth by suffocation or strangulation. This strangulation leads to preservation and increased shelf life and prevents mycelial growth from moving towards the filter which will permit the fungi to expend their life cycles too early and reduced performance of the product. A label is applied and the end consumer product is ready for distribution. Once the product is purchased by the consumer and placed in an indoor growing environment, then any exterior seal 15 is removed by the consumer and carbon dioxide will begin being supplemented to the indoor growing environment. In the preferred embodiment, the sealing mechanism may be used as a hanger for the bag in the indoor growing environment so that the bag may be placed above the level of the plants. See FIG. 15. Each bag receives a "replace by" date when it is packed and shipped.

The food substrate 18 as inoculated with spawn 17 creates the mycelial mass 19 inside a transparent or translucent polypropylene bag 10 with a gaseous interchange portal 11. See FIGS. 4-6 and 10-14. The bag or container 10 may be opaque and still function according to the objectives of this invention. See FIGS. 1-3 and 7-9. As has been described, the inoculation of the substrate is done by adding pure spawn under sterile conditions. The bag and substrate are inoculated with spawn forming the mycelial mass 19 of the present invention. In the preferred embodiment, the combination weighs approximately six (6) pounds (2.72 kg). Preferably, about ⅓ of a cup (79 ml) of pure culture spawn 2010 will be added from the sterile vessel to each bag of sterilized substrate. With about six (6) pounds (2.72 kg) of bagged and sterilized substrate, good mycelial growth can be optimized with adequate food and nutrient consumption resulting in at least a six (6) month production period after the external clamp 15 is removed. A heat impulse sealer is preferably used to permanently seal the top of the bag 10. In this case, the seal 12 is approximately 1.5 inches (3.8 cm) from the top of the bag. However, any air-tight sealing means may be employed. The sealing of the bag 10 closes the sterile environment and the mycelium 17 can produce $CO_2$ using the food 18 in the mycelial mass 19. The bag 10 should not be opened again except for disposal and recycling. Opening the bag 10 would interrupt the flow of $CO_2$ and could possibly contaminate the mycelial mass 19. The use of an air exchange portal 11 such as the Unicorn™ filter bag or other biological breather patch allows the most ideal environment for the mycelial mass 19 to create and supplement $CO_2$ to the surrounding environment.

After mixing, the preferred embodiment of the present invention provides an artificial environment from which naturally-produced $CO_2$ can be supplemented to an indoor or man-made growing environment as illustrated in FIG. 15. The end consumer will activate the $CO_2$ supplementation by removing the external seal 15 and placing the bag in an indoor growing environment, preferably at a height above the height of the plants. Since carbon dioxide is a heavy molecule, $CO_2$ will precipitate downward in atmospheric air and thus the product should be placed at a level higher than growing plants, so that $CO_2$ will fall into or onto the plants. While setting the inoculated bag on a high shelf will work, a hanger 153 is desirable. As shown in FIGS. 1-14, a hanger 153 may be accompanied by a hole 154 of any size and shape to accommodate a gardener's facility and provide use of the bag 10 in close proximity with green plants.

The use of a removable external seam 15 provides a uniquely viable strategy to allow for the long-term storage of biologically active organisms separate from inorganic molecules but may also serve to separate small organic molecules in a contained growing environment. The selectively removable separation seam can permit the delayed inoculation of a sterile growing medium. Alternatively, the separation seam may provide for a strategically timed reaction between a reagent and another substance such as is visible in FIGS. 4-6 and 10-14. Such options provide the basis for alternative embodiments of the present invention. The first zone 13 may serve as a biologic zone. The biologic zone may be on the opposite side of a seal from the breather patch 11 or be on the same side or partially same side as the breather patch. In such embodiments, the second zone 14 contains the nonliving or reagent or food source for mixing the matter in the first zone 13 whenever the seal is removed. Additional zones may be added by folding to overlap the bag within a single clamp or by adding more external clamps. As illustrated in FIGS. 1-14, an additional middle chamber zone 20 may comprise the air exchange portal 11 section and be separated from the upper section 13 and lower section 14. In each embodiment, the zones are created by one or more seals formed by a clamp 15 and alternatively a fold in the container. The clamp typically has a first wall 151 and a second wall 152. The exterior portions or one or more panels of the bag are slipped, squeezed, crimped, or clamped between the first wall 151 pressing against the second wall 152 forming a separation seal 41. The preferred clamp 15 is removable and replaceable. The movement of the clamp will serve different purposes based on various positioning called for in the various embodiments. Wherever the positioning of the clamp, a buffer space 16 may aid in the separation between the first chamber zone 13 and the second chamber zone 14. The external sealing mechanism substantially separates air flow from any zones not incorporating the breather patch. Alternative means for sealing the bag other than clamps, such as internal perforations or seals requiring less material or expense will be advantageous so that the clamp, which also serve as a hanger, may be reused by repeat customers.

Embodiments of the present invention include transparent and opaque bag versions. An opaque embodiment may be advantageous in certain circumstances, such as for particular organisms, and is specifically illustrated in FIGS. 1-3, and 7-9. The bag 10 in FIGS. 4-6 and 10-14 is illustrated to indicate that the bag is transparent and that the substances contained in the lower zone 13, middle zone 20, and the upper zone 14 are visible. While FIGS. 4-6 and 10-14 also visibly demonstrate the alternative embodiments where living organisms are segregated from their food source and while the separation is illustrated in these views, aspects of the present invention may be practiced in opaque and transparent bags without restriction. Returning to reference FIGS. 4-6 and 10-14, the first zone of the preferred embodiment is also called the upper chamber section 13 and may referred to as the biologic zone, spawn pod or activator zone. The biologic zone 13 of the illustrated embodiments preferably occurs on the opposite side of a seal from the breather patch 11. Here, the second zone is also called lower chamber section 14 and may be referred to as the un-inoculated substrate receptor zone 14. In embodiments having a receptor zone 14, that zone contains the nonliving or reagent for mixing the matter in the activator zone 13. In such embodiments, the spawn 17 are housed in the first zone 13 which occurs in the upper portion of the bag 10 between the clamp 15 and the top seal 12. Thus, in this embodiment, the first zone 13 is substantially air tight and further, in this embodiment, the growth medium or substrate 18 is stored in the second zone 14 in the lower portion of the bag and is also substantially air tight. The third and final zone illustrated here comprises the middle zone 20 which serves as the air zone and the first and second zones are both separated from the breather patch 11 by the dual seals. To begin using the carbon dioxide created by this and the other alternative product models, the user must remove the temporary seal 15 or seals and combine the contents of the first zone 13 with the contents of the second zone 14. Once the seal 41 has been removed and the growing substrate 18 has been inoculated with the spawn 17 by mixing the contents of the respective zones, outputs of $CO_2$ will increase substantially. Some additional action may be required. For example, for mycelium being inoculated onto a food substrate in the bottom of the bag, the mycelium may require a bit of mixing such as shaking or massaging from the exterior of the bag and then the bag contents will need to be compressed again so that the mycelium are in close contact with the food source. When all of the zones are in communication with one another, oxygen will enter the bag and carbon dioxide will leave the bag through the air exchange portal 11.

Figure 16:
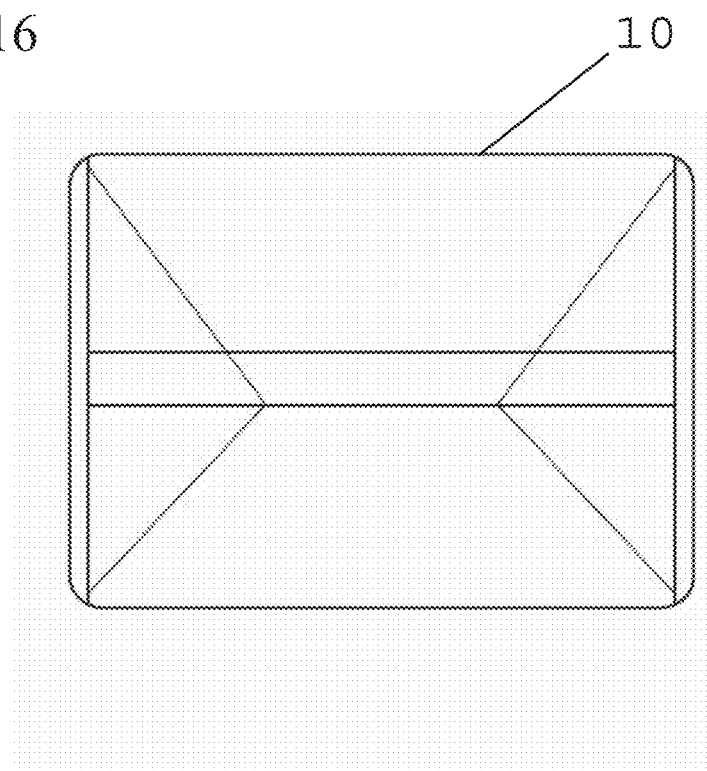
FIG. 16 is a bottom view of an opaque bag showing the bottom seal of the bag.

The bottom view of the present invention in FIG. 16 shows one manner in which a bag 10 may be folded and permanently sealed at the bottom of the bag. This particular seal is typically created at the factory when the bag is manufactured. The top seal particularly visible in FIGS. 1-14 is created after the bag contents are added. In all embodiments of the present invention, the chambers are temporarily sealed using an exterior bag clamp 15 which substantially seals the air exchange between the chambers on either side of the clamp 15.

For each embodiment calling for a separation of a mycelia from its food source, the steps of preparation described above will differ because the inoculation will be delayed. Thus, for some embodiments, the steps for preparation of the consumer product are modified after cooling the autoclaved bulk substrate and bag as follows:

applying a fold and/or at least one removable clamp to the exterior of the bag product (either above, over, or below the breather patch according to the desired embodiment);

depositing the spawned mycelium into the upper chamber 13 of the bag;

sealing the bag;

distributing the product to consumers with instructions to remove the clamp from the exterior of the bag.

The consumer will then:

remove the clamp to inoculate the artificially prepared substrate in the bag with the artificially prepared spawned fungus to create a mycelial mass; and utilize the mycelial mass and bag for $CO_2$ supplementation.

The present invention allows for long-term storage of a carbon dioxide generator wherein the apparatus comprises a lower portion, an upper portion, and a middle portion created by one or more intervening seals which may separate the mycelia from the food substrate. For purposes of fungal and natural $CO_2$ products the distinct zones of alternative embodiments will be alternatively filled with a sterilized, un-inoculated food, isolated spawn of one or more biologically active organisms, and/or air access or no air access. By way of example and not by limitation, this may result in embodiments including:

Food sealed away from air exchange portal and spawn sealed away from air exchange portal, Spawn sealed away from food and also sealed away from air exchange portal, Food and spawn together and sealed away from air exchange portal, Food sealed away from air exchange portal and spawn partially sealed away from air exchange portal, Food partially sealed away from air and spawn sealed away from air exchange portal, Spawn partially sealed away from food and partially sealed away from air exchange portal, Food and spawn together and partially sealed away from air exchange portal. In each instance a single container could hold more than one spawn pod and more than one food substrate as may be desired and is accomplished by the application of additional seals to separate the sections of the container. The specific preparation of the bulk food substrate will follow the preparation for the preferred embodiment. The specific preparation of the spawn will also follow the preferred embodiment methodologies. The preparation of each will be according to laboratory standards. The preparation of the alternative embodiments will diverge from the preferred embodiment in the final steps as stated above.

This disclosure has discussed and described segregation that occurs in the top, middle, and bottom of a container. Applicants foresee that it will be advantageous in certain circumstances to provide the separation seam in a diagonal or other orientation. An isolated corner of the container may be all that is necessary. So long as the respective one, two, or more chambers are separated by an external seam and/or a fold, it is contemplated within this disclosure. It is further expected that with manufacturing refinements, the zones may be accomplished by pods within the container which can be actuated by means to release the pod and allow the respective chambers to fuse. Fusion of the complementary components in the container may be accomplished in any manner that accomplishes the goals of this invention. The various zones may be provided within the container in various sizes. The mycelial spawn in the biologic chamber may need only be a fraction of the size illustrated in the accompanying drawings. However, reference to FIGS. 4-6 and 10-14 will give one perspective on the size and shape differential between the upper or first zone 13 to the lower chamber or zone 14. For these embodiments, the first zone 13 holds the spawn 17 below the top seal 12 of the bag 10, while the lower chamber or zone 14 houses the food growth substrate 18 and either the clamp 15 or the clamp and fold separate the breather patch 11 in the middle zone 20 while also creating a dead air space 16 between the zones. A bag 10 such as a Unicorn™ bag with a micro-porous air or gas exchange portal, or breather patch 11 and a top seal 12 provide the defining parameters for the seam to create the separate zones, also called chambers or compartments.

The present invention requires no maintenance and very minimal set-up for any embodiment. Ease of use and low cost make the present mycelial-based $CO_2$ supplement the best option. The bag cultivates $CO_2$ each hour of each day with no need to refill bottles or use expensive $CO_2$ production units. This mycelial mass in the vented cultivator produces $CO_2$ and the microporous breather patch releases $CO_2$ enhancement continually for at least six (6) months without any further effort or expense.

In the preferred embodiment, an elongate, slide-on clamp such as that sold under the commercial name of the GRIPSTIC® suits the need of a clamp. In the GRIPSTIC® clamp design, the first wall and the second wall of the clamp are fixed together providing a channel through which the bag may slide, similar to the action provided by a ZIPLOC® storage bag. Other clamps are known in the field and would meet the objectives of the present invention. The GRIPSTIC® has additional utility for the objectives of the present invention because it provides a handle 153 with a hole 154, see e.g., FIGS. 1-15. These aspects serve as the bag's hanger.

Various embodiments of the present invention may optimize shipping of the consumer product due to their size and shape. In shipment, the top portion of the bag 10 may be allowed to flop over. In some embodiments, this will occur under the weight of the clamp. The dead air space 16 provides excess bag 10 slack which can lay over the side of the substrate and provide added spatial separation between the zones.

The preferred strain, Turkey tail (*Trametes versicolor*), is strong and continues to produce $CO_2$ for at least half a year and at that point $CO_2$ production begins to slowly decline but $CO_2$ levels above ambient levels can still be detected up to sixteen (16) months later. Contrary to objectives sought when choosing a mushroom strain with fruiting production in mind, when looking at a strain for $CO_2$ production a strain that has low or no fruiting will produce more $CO_2$ for a longer period of time. After a strain actually produces a fruiting body, $CO_2$ production falls off as vigor drops. The process of reproduction triggers a scale back in processes as the genetics have been passed on and preservation is insured with the next generation. But with Turkey tail, $CO_2$ is constantly being expired or expelled by the saprobes or fungi in the mycelial mass. Once the clamping seal is removed, $CO_2$ is passed from the interior of the bag to the indoor growing environment surrounding it by natural dispersal by air-exchange chemical processes. See FIG. 15. Contrary to prior belief, it is not necessary to actuate this expulsion with any agitation or mechanical or electrical means but the transfer will occur naturally to a beneficial level if the growth and containment is controlled according the present invention disclosure.

The standard carbon dioxide supplementing product disclosed herein is designed for small to medium grow spaces, or more specifically, one such cultivator will provide 4-6 plants or a 4 feet by 4 feet or 128 cubic foot space (3.62 cubic meter) with the $CO_2$ necessary for six (6) months of supplementation. Various sizes, including micro and extra large bag sizes prepared according to this invention in different magnitudes will service many sizes of grow rooms. A $CO_2$ micro bag is ideal for use in clone domes and in seedling trays. These micro bags help stimulate root development and insure healthy starter plants. The $CO_2$ micro bag will insure that a 3.5 cubic foot space (0.099 cubic meter) is enriched with $CO_2$ for at least three (3) months. An extra large (XL) bag will service medium to large-sized areas like greenhouses. The XL bag will cover 6 feet by 6 feet, or 288 cubic feet (8.16 cubic meter) with $CO_2$ for at least six (6) months. These $CO_2$ bags can be used for both vegetative plant growth as well as for fruit and flower production. During consumer use, it is average for the passive $CO_2$ system of the present invention to continually produce $CO_2$ and release it through the microporous filter patch on the bag. Specifically, flow rates of the $CO_2$ supplement are between 2500-3000 ppm/4845-5813 mg/m$^3$ (+/−0.5 ft$^3$ per minute or +/−14.2 liters per minute).

While the present invention is directed toward extending the shelf life of a biologically activated, natural carbon dioxide generator by providing an external actuation device of the separation seam, the concept may be applied to other natural biological generators, such as bacterial carbon dioxide production. The device also has beneficial applications in mushroom cultivation. For example, the upper zone may be mushroom spores which may be sprinkled onto the top of growth medium by removal of the externally actuated separation seam. This application would prevent contamination of the spores or growth medium with bacteria or mold in the commercial transport, sale or distribution of these mushroom growing kits. The kits could be sterilized and or pasteurized in the bag within a laboratory setting and then sealed without any additional venting to the open air. Thus, contamination risks are greatly reduced.

The spawn-separating embodiments of the present invention will be particularly useful in conjunction with fungal growth. Delaying the inoculation of a substrate while still processing the material the same way will allow an end user to inoculate the substrate when he or she feels the need. Typically, as suggested in some preparations herein, fungal substrates are inoculated shortly after the sterilization process. Once inoculation has occurred fungal growth begins in earnest. This process is difficult to slow down or curtail. The growth will only slow or stop when available nutrients are exhausted. With existing mushroom growing kits and $CO_2$ production products, delayed inoculation was not thought to have efficacy. There was a need to delay the inoculation so that products have a longer shelf life and to give the end user more control of when she chooses to activate the output of existing products. The present invention meets the needs in the industry. Another benefit of this invention is the ability to ship products long distances and still be able to provide customers with a fresh product. Isolation or partial isolation from larger food sources and also from oxygen slows the life processes of the spawn further meeting these objectives.

The design could also have beneficial and unique applications in many other industries. It may be used in gardening applications whether or not sterilization is important. Novelty kits having seeds and soil could be provided as an all-in-one gift set. This type of kit is particularly amenable to plants such as herbs which are commonly sold as self-contained herb gardens. Educational gardening kits are another example for which this invention may have utility. Even more exotic, extra-terrestrial applications of a sealed garden environment are possible. As with the spawn pod 17, biological components could be sealed away from external environmental influences.

The bag is preferably made of recycled polypropylene or other plastic which may be further recycled. The bag material must be heat-tolerant for sterilization purposes. The preferred bags should be designed to withstand temperatures up to 250 degrees Fahrenheit (121° C.). There are a number of different types of vented bags available which have been developed for the purpose of creating an environment suitable for mycelial growth and production. All of these bags are suitable to use for the present invention's process, apparatus, and application. Ideally, the preferred vented bag will contain a microbiological filter that acts as a gaseous interchange portal that will allow gas exchange without allowing contaminants to enter the bags. In the preferred embodiment, a Unicorn™ bag or the functional filter-bag equivalent is used as the plastic bag container. While this bag is optimal for the purposes of the invention, it is but one bag which will accomplish the objectives of $CO_2$ production of the present invention.

As used herein, spawn is actively growing mycelia. In the present invention, spawn is placed on a growth substrate to seed or introduce mycelia to grow on the substrate. This is also known as inoculation, spawning or adding spawn. The primary advantages of using spawn is the reduction of contamination while giving the mycelia a firm beginning Spores are another inoculation option, but are less developed than established mycelia. Either spores or mycelia used in the present inventive process are only manipulated in laboratory conditions within a laminar flow cabinet. The process of making the present invention utilizes sterile laboratory protocols and pure mycelial culture.

While all strains of mycelium from the kingdom Fungi including Basidiomycetes and Ascomycetes are suitable for this application, strains that exhibit little or no fruiting characteristics are preferred. When producing $CO_2$, it is desirable to avoid primordial production and to have only mycelial growth occur. This is because primordial formation diminishes $CO_2$ production by fungi. The process disclosed in the present invention will also create an ideal environment for the controlled and non-flowering growth of mycelium.

For the preferred embodiments of this invention, the fungal strain utilized is *Trametes versicolor* which is a white-rot fungus known by the common name, "Turkey Tail." *Trametes versicolor* causes a general delignifying decay of cellulose-based substrates such as but not limited to hardwoods. The appearance of this fungi is whitish in color which may be aesthetically pleasing when the bag is placed for $CO_2$ production. This visual appearance of this strain is helpful during the incubation phase of the process when trying to achieve optimum incubation periods. Furthermore, the *Trametes versicolor* mycelium is very active and aggressive and grows very quickly resulting in good $CO_2$ production. The use of the polypropylene bag and the naturally occurring strain in organic materials make every aspect of the present invention readily recyclable. The clip may be re-used for other purposes once the bag is exhausted. Furthermore, while pre-consumer materials may be used, the preferred materials are made of previously used and recycled materials.

It is further intended that any other embodiments of the present invention which result from any changes in application or method of use or operation, method of manufacture, shape, size, or material which are not specified within the detailed written description or illustrations contained herein, yet are considered apparent or obvious to one skilled in the art, are within the scope of the present invention.

What is claimed is:

1. A consumer product to harness and selectively supply carbon dioxide to an indoor growing environment comprising:
    a container having a lower section, an upper section, and an air exchange portal section,
    a removable external sealing mechanism attached to the container to divide the container and restrict airflow between the lower section, the upper section, and the air exchange portal section,
    mycelia disposed in the upper section, and
    a food source disposed in the lower section,
    wherein the mycelia and the food source are both isolated from airflow of the air exchange portal section.

2. The consumer product of claim 1, wherein the container is a bag.

3. The consumer product of claim 2, wherein a fold applied to the bag cooperates with the external sealing mechanism to isolate the mycelia and the food source from airflow in the air exchange portal section.

4. A consumer product to harness and selectively supply carbon dioxide to an indoor growing environment comprising:
    a container having an interior and an exterior and an air exchange portal,
    mycelia disposed in the interior of the container,
    a food source disposed in the interior of the container,
    at least one removable external sealing mechanism applied to the exterior of the container divides the container into at least one lower section, at least one upper section, and at least one air exchange portal section,
    wherein the at least one removable external sealing mechanism separates the mycelia and the food source from airflow in the at least one air exchange portal section.

5. The consumer product of claim 4, wherein there is only one upper section.

6. The consumer product of claim 4, wherein there is only one lower section.

7. The consumer product of claim 4, wherein there is only one air exchange portal section.

8. The consumer product of claim 4, wherein the mycelia are disposed in the at least one upper section.

9. The consumer product of claim 4, wherein the mycelia are disposed in the at least one lower section.

10. The consumer product of claim 4, wherein the food source is disposed in the at least one lower section.

11. The consumer product of claim 4, wherein a fold cooperates with the at least one removable seal mechanism to divide the container.

12. The consumer product of claim 4, wherein the at least one lower section is partially joined with the at least one air exchange portal section.

13. The consumer product of claim 4, wherein the at least one upper section is partially joined with the at least one air exchange portal section.

14. The consumer product of claim 4, wherein there are two removable external sealing mechanisms.

15. The consumer product of claim 4, wherein the at least one lower section, the at least one upper section, and the at least one air exchange portal section are created by only one external sealing mechanism applied to either side of a fold.

16. A consumer product to harness and selectively supply carbon dioxide to an indoor growing environment comprising:
    a container having an interior and an exterior and an air exchange portal,
    mycelia disposed in the interior of the container,
    a food source disposed in the interior of the container,
    two removable external sealing mechanisms applied to the exterior of the container divides the container into a lower section, an upper section, and an air exchange portal section,
    wherein the external sealing mechanisms separate the mycelia and the food source from airflow in the air exchange portal section.

17. The consumer product of claim 16, wherein the mycelia are disposed in the upper section.

18. The consumer product of claim 16, wherein the food source is disposed in the lower section.

19. The consumer product of claim 18, wherein the mycelia are also disposed in the lower section.

* * * * *